United States Patent
Kisiler et al.

(10) Patent No.: US 11,878,795 B2
(45) Date of Patent: Jan. 23, 2024

(54) AUTONOMOUS MOBILE WORKFORCE SYSTEM AND METHOD

(71) Applicant: Honda Motor Co., Ltd., Tokyo (JP)

(72) Inventors: Mark Kisiler, Torrance, CA (US); Victor Acuña, San Pedro, CA (US); Bonnie Hu Chen, Torrance, CA (US); Shaun Kohei Westbrook, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 422 days.

(21) Appl. No.: 16/720,288

(22) Filed: Dec. 19, 2019

(65) Prior Publication Data
US 2021/0188430 A1    Jun. 24, 2021

(51) Int. Cl.
| | |
|---|---|
| B64C 39/02 | (2023.01) |
| G06Q 10/0631 | (2023.01) |
| B64U 80/70 | (2023.01) |
| B64U 101/00 | (2023.01) |
| G05D 1/00 | (2006.01) |
| G08G 5/00 | (2006.01) |
| G05D 1/10 | (2006.01) |
| G05D 1/12 | (2006.01) |

(52) U.S. Cl.
CPC ......... *B64C 39/024* (2013.01); *G05D 1/0027* (2013.01); *G05D 1/104* (2013.01); *G05D 1/12* (2013.01); *G08G 5/0069* (2013.01); *B64U 80/70* (2023.01); *B64U 2101/00* (2023.01); *G06Q 10/0631* (2013.01)

(58) Field of Classification Search
CPC ............ B64C 39/024; B64C 2201/126; B64C 2201/201; G05D 1/0027; G05D 1/104; G05D 1/12
See application file for complete search history.

(56) References Cited

U.S. PATENT DOCUMENTS

| | | | |
|---|---|---|---|
| 5,974,348 A | 10/1999 | Rocks | |
| 8,380,350 B2 | 2/2013 | Ozick et al. | |
| 10,011,352 B1* | 7/2018 | Dahlstrom | ............. B64U 30/20 |
| 10,532,885 B1* | 1/2020 | Brady | .................. G06Q 10/083 |

(Continued)

FOREIGN PATENT DOCUMENTS

| | | |
|---|---|---|
| CN | 105096177 | 11/2015 |
| CN | 107220835 | 9/2017 |

(Continued)

*Primary Examiner* — Anne Marie Antonucci
*Assistant Examiner* — Jared C Bean
(74) *Attorney, Agent, or Firm* — RANKIN, HILL & CLARK LLP

(57) ABSTRACT

A method for workforce management includes receiving a service request associated with a task area from a user device, and controlling movement of an unmanned aerial machine from a home base to the task area. The unmanned aerial machine acquires evaluation data about the task area. The method also includes determining a task to be performed based on the service request, the task area, and the evaluation data. Further, the method includes selecting one or more autonomous machines to perform the task based on at least the task and a location of the task area, and controlling the selected one or more autonomous machines to perform the task

17 Claims, 16 Drawing Sheets

(56) References Cited

U.S. PATENT DOCUMENTS

| | | |
|---|---|---|
| 2007/0021867 A1 | 1/2007 | Woo |
| 2013/0054280 A1 | 2/2013 | Moshfeghi |
| 2014/0111332 A1* | 4/2014 | Przybylko .............. G06Q 10/00 340/573.6 |
| 2017/0023947 A1* | 1/2017 | McMillion ............... B64D 1/22 |
| 2018/0137454 A1* | 5/2018 | Kulkarni ............... B64C 39/024 |
| 2018/0253092 A1* | 9/2018 | Trapero Esteban .. B64C 39/024 |
| 2020/0319640 A1* | 10/2020 | Vogel .................... A47L 9/2842 |

FOREIGN PATENT DOCUMENTS

| | | |
|---|---|---|
| CN | 108846975 | 11/2018 |
| CN | 109343365 | 2/2019 |

\* cited by examiner

AUTONOMOUS MOBILE WORKFORCE SYSTEM AND METHOD

BACKGROUND

Artificial intelligence and advanced robotics are increasingly becoming a part of everyday life. For example, mobile robotic devices, such as, robotic vacuum cleaners, have been developed for routine predictable tasks and environments that are conducive to automated work. Typically, these mobile robotic devices are individual units that automatically return to a charger upon completion of a single task and/or when battery charge is low. Tasks that take place in an unpredictable physical environment require advanced social, cognitive, and physical capabilities to navigate the environment and perform tasks effectively. As mobile robotic devices continue to proliferate, effective management of multiple mobile robotic devices for executing multiple predictable and unpredictable physical tasks is desirable.

BRIEF DESCRIPTION

According to one aspect, a method for workforce management includes receiving a service request associated with a task area from a requesting device, and controlling movement of an unmanned aerial machine from a home base to the task area. The unmanned aerial machine acquires evaluation data about the task area. The method also includes determining a task to be performed based on the service request, the task area, and the evaluation data. Further, the method includes selecting one or more autonomous machines to perform the task based on at least the task and a location of the task area, and controlling the selected one or more autonomous machines to perform the task According to another aspect, a networked workforce computing system, includes user devices, autonomous machines, a task management server, and a processor operatively connected for computer communication to the requesting devices, the autonomous machines, and the task management server over a network. The processor receives service requests associated with task areas from the requesting devices, and determines tasks to be performed based on the service requests and evaluation data. The evaluation data is about the task areas and is received over the network. The processor selects a number of autonomous machines that are equipped to fulfill the tasks based on at least the service requests, the evaluation data, and a location of the task areas. The processor controls the selected autonomous machines to perform the tasks.

According to a further aspect, a non-transitory computer-readable storage medium including instructions that, when executed by a processor, cause the processor to receive a service request associated with a task area from a requesting device and transmit a command to an unmanned aerial machine to drive the unmanned aerial machine to the task area. The unmanned aerial machine acquires evaluation data about the task area. The processor determines a task to be performed based on the service request, the task area, and the evaluation data, and transmits a command to one or more autonomous machines to select the one or more autonomous machines to drive to the task area and execute the task based on at least the task and a location of the task area.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
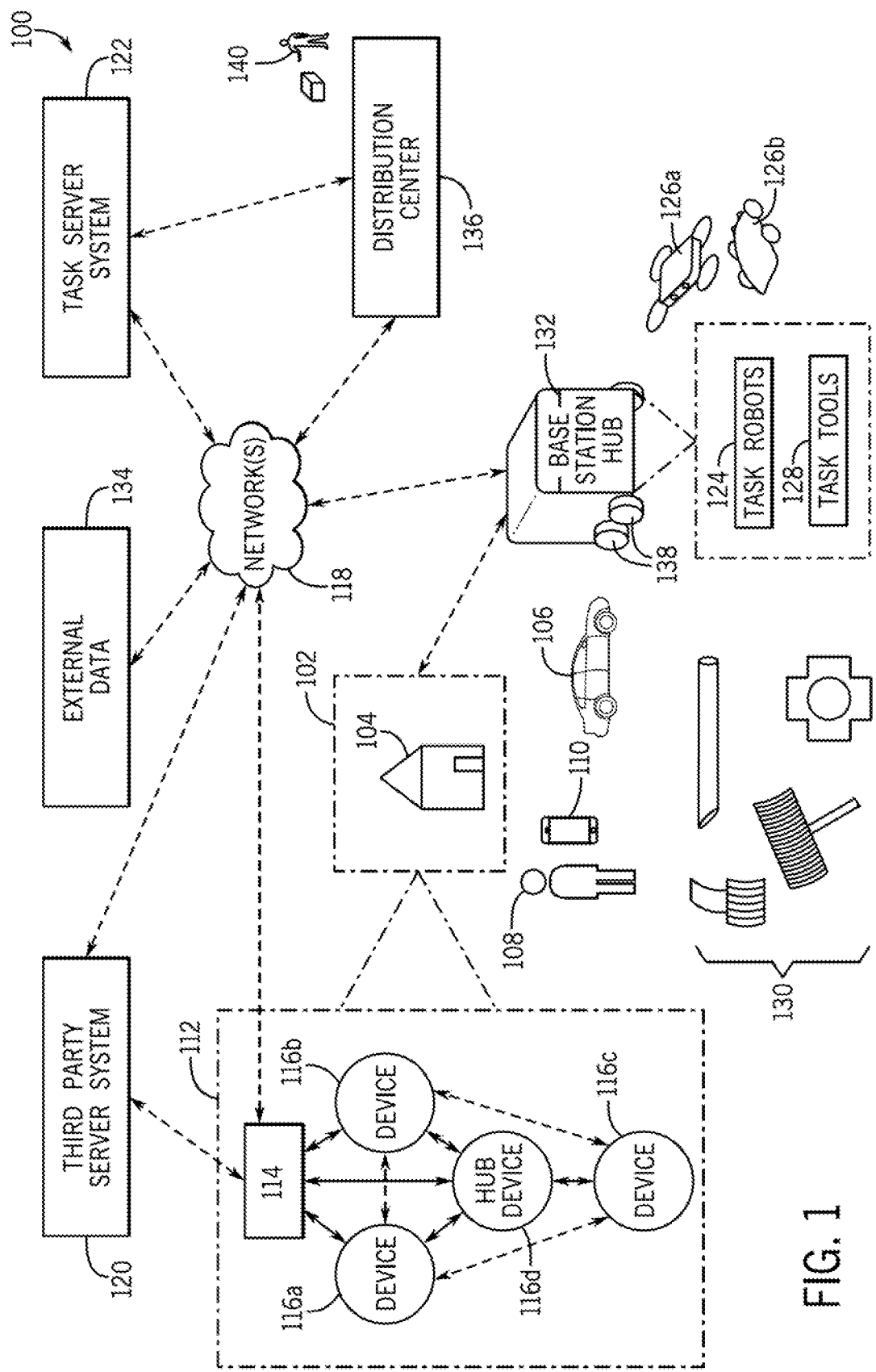
FIG. 1 is a schematic view of an exemplary operating environment and workforce system according to one embodiment.

The following detailed description is intended to be exemplary and those of ordinary skill in the art will recognize that other embodiments and implementations are possible within the scope of the embodiments described herein. The detailed description begins with definitions of terms used throughout. The exemplary embodiments are first described generally with a system overview including a description of the components of an autonomous mobile workforce ecosystem. After the general description, exemplary methods for an autonomous mobile workforce implementing the system components are presented. These methods include task initiation and evaluation, task determination and execution, task settlement and feedback, maintenance, and monitoring, among others. Exemplary implementations of these methods are also described. Further, embodiments related to levels of regional management for an autonomous mobile workforce are also discussed. For organizational purposes, the detailed description is structured into sections identified by headings, which are not intended to be limiting.

I. Definitions

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others.

"Component." as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles. The term "vehicle" may also refer to micro-mobility transportation devices, which may include, but are not limited to, a bike, a scooter, a robot, a drone.

II. System Overview

Referring now to the drawings, wherein the showings are for purposes of illustrating one or more exemplary embodiments and not for purposes of limiting same, FIG. 1 illustrates a workforce system 100 according to an exemplary embodiment. The components of the workforce system 100, as well as the components of other systems, hardware architectures, and software architectures discussed herein, may be combined, omitted, or organized into different architectures for various embodiments. As will be discussed herein, the workforce system 100 facilitates seamless management and automation of physical tasks (e.g., unpredictable physical work and predictable physical work) using one or more autonomous machines. In one embodiment, the workforce system 100 facilitates task evaluation and task execution within a task area 102. The task area 102 is a virtual boundary or a real-world boundary where one or more tasks are to be performed by one or more autonomous machines. In some embodiments, the task area 102 is a property line associated with real-property, for example, a structure 104 (e.g., a house, a building). The task area 102 may be pre-defined or created in real-time. For example, the task area 102 may be created based on property records, or created in real-time by the evaluation and analysis systems discussed herein.

Furthermore, the task area 102 may include exterior areas and interior areas, for example, a room inside the structure 104 (e.g., a bedroom, a kitchen, a living room), more than one room of the structure 104, an exterior portion of the structure 104 (e.g., roof, siding, car port), land and/or other features adjoining and/or adjacent to the structure 104 (e.g., a front lawn, a back lawn, a pool, a garden, a flower bed, a gazebo), and so on. It is contemplated that the task area 102 could include sub-task areas (not shown) within the task area 102. The task area 102 and/or the structure 104 may be associated with a user 108 (e.g., a property owner, a customer) and/or a requesting device 110 (e.g., a mobile device associated with or possessed by the user 108). As will be discussed herein, the requesting device 110 may transmit a service request associated with the task area 102 to trigger performance of a task. Additionally, in some embodiments, the task area 102 includes and/or is associated with a vehicle 106. In some embodiments, the vehicle 106 is associated with the user 108 and/or the requesting device 110. As discussed above, the vehicle 106 may be a micro-mobility device (e.g., scooter, e-bike).

Referring again to the workforce system 100, a smart home network 112 may also be associated with the structure 104 and/or the task area 102. The smart home network 112 includes devices (e.g., smart devices, IoT devices) that are integrated with the structure 104 and/or land or other structures adjoining and/or adjacent to the structure 104. These devices provide intelligent sensing of the structure 104, objects and/or biological beings inside or outside of the structure 104, and intelligent control of one or more devices and/or features of the structure 104. In FIG. 1, the smart home network 112 includes a device 116a, a device 116b, a device 116c, and a device 116d. For convenience, in some embodiments, the device 116a, the device 116b, the device 116c, and the device 116d will be referred to collectively as the devices 116.

The devices 116 may include, but are not limited to, smart convenience devices (e.g., smart locks (e.g., doors), smart trackers, internal positioning systems, smart lighting, smart bike locks and trackers, smart trash cans, smart toilets, smart beds, smart vacuums); smart energy devices (e.g., smart plugs, smart irrigation controllers, energy monitors, smart vents, smart thermostats, temperature controlled flooring, smart humidity control, smart fans, smart shades); smart security devices (e.g., smart security cameras, smart entrance systems, smart parcel delivery); smart appliances (e.g., smart refrigerators, smart ovens, smart dishwashers, smart laundry, smart dishes, smart slow cookers, smart coffee pots, water detectors, meters); smart media devices (e.g., tv, speakers); smart pet care devices (e.g., video monitoring, self-cleaning litter boxes, smart mats, smart pet doors, smart feeders, smart beds); other smart home devices and/or IoT devices (e.g., smart pool, smart shower, smart wardrobe, occupancy sensing systems); and smart health monitoring devices (e.g., wearable devices, biometric devices, smart cribs, massage chair, smart air quality devices, smart breathalyzer systems), among others. One or more of the devices 116 may be part of a home automation system.

The devices 116 may be positioned inside the structure 104, outside and attached to the structure 104, or outside and separate from the structure 104. For example, a smart thermostat device may be positioned inside the structure 104 while a smart pool device may be positioned outside the structure 104. The devices 116 may include any number and any type of sensing technology for detecting and/or sensing a parameter of the devices 116, the structure 104, and/or the environment surrounding the structure 104. Thus, the sensing technology may include, but is not limited to: acceleration sensors, proximity sensors, vision sensors, ranging sensors, environmental sensors, position sensors, GPS sensors, among others. The sensing technology may be any type for example, acoustic, electric, environmental, optical, imaging, light, pressure, force, thermal, temperature, proximity, among others. Exemplary sensors will be discussed in more detail with FIG. 9.

In the embodiment shown in FIG. 1, the device 116d may be referred to as a hub device 116d that creates a mesh network with the device 116a, the device 116b and the device 116c in the smart home network 112. Thus, the home network 112 includes a network interface 114 (e.g., a router) and the hub device 116d connects to network(s) 118 directly or via the network interface 114. The device 116a, the device 116b, the device 116c, and the hub device 116d may each be connected for computer communication to one another using any type of wired or wireless computer communication protocol. In one embodiment, radio communication is used between the devices 116, for example, WiFi, ZigBee, DigiMesh, ZNet, any of the protocols discussed in Section I, among others.

The devices 116 may be controlled and/or interacted with via another device, for example, the requesting device 110, a third party system and server 120, and/or an application (not shown) running on another device The devices 116 may communicate with these devices over the network(s) 118. As shown in FIG. 1, the devices 116 may be connected for computer communication to the third party server system 120 via the network interface 114 and/or the network(s) 118. The third party server system 120 may include service providers and/or application programming interfaces that facilitate operation of one or more of the devices 116. As an illustrative example, a home security system and server may facilitate operation of a smart camera device, including, storing data from the smart camera device, providing software upgrades, providing paid for subscriptions and services, among others.

Computer communication of one or more of the components of the workforce system 100 may be carried out using any of a variety of wireless protocols and/or any of a variety of wired protocols as described in Section I above, or any other suitable communication protocol. The devices 116 may also communicate and/or integrate with external sensing devices and systems, for example, smart infrastructure, smart city devices, other vehicles, among others. Thus, the devices 116 may share or receive data to and from external sensing devices and systems. This data may be referred to as external data 134, which may include, for example, weather data, pricing information, road conditions, traffic conditions, pedestrian conditions, municipality information, home information, utility information, among others.

Referring again to FIG. 1, the workforce system 100 includes a task server system 122 that facilitates task creation and execution, among other workforce management functions. In particular, the task server system 122 manages one or more autonomous machines for automating one or more tasks. Autonomous machines may include, for example, task robots 124 and task tools 128. The task robots 124 may be any type of machine that is capable of carrying out complex tasks automatically that have effects on the physical world and is programmable by a computer. Thus, the task robots 124 are artificially intelligent machines that sense and interact with the real world. Said differently, and as defined by the Robotics Industry Association, a reprogrammable, multifunctional manipulator designed to move material, parts, tools or specialized devices through variable programmed motion for a variety of tasks.

The task robots 124 may be of any type, for example, industrial robots, robots for domestic tasks, field robotics, cleaning robots, assistance robots, inspection robots, emergency response robots, construction and demolition robots, logistic robots, medical robots, humanoid robots, autonomous vehicles, among others. The task robots 124 may employ any type of locomotion or kinematics. Thus, the task robots 124 may be legged robots, wheeled robots, swimming robots, flying robots, among others. In FIG. 1, the task robots 124 include an unmanned aerial vehicle (UAV) 126a and/or an autonomous vehicle 126b. Although the descriptions herein refer to examples including the UAV 126a and the autonomous vehicle 126b, other types of task robots and other quantities (e.g., more than two) may be implemented with the systems and methods described herein.

The task tools 128 include tools, attachments, appendages, and accessories used to execute a variety of tasks. Exemplary task tools are indicated by numeral 130, for example, a rake head attachment, a cleaning brush attachment, a vacuum attachment, and a lawn maintenance blade. In some embodiments, the task robots 124 may include one or more of the task tools 128 (e.g., as an appendage or attachment) and/or may be able to utilize one or more of the task tools 128 for completing a task.

In one embodiment shown in FIG. 1, the task robots 124 and/or the task tools 128 are stored and/or deployed from a base station pod 132. The base station pod 132 may be a device and/or an autonomous machine that is positioned within or near one or more task areas. The base station pod 132 can be a type of autonomous vehicle that may move autonomously using wheels 138. The base station pod 132 may travel from a distribution center 136 to the task area 102. The distribution center 136 may be used to store pods, autonomous machines, task robots 124, task tools 128 when not in use and/or for maintenance of same. In some embodiments, the base station pod 132 may be loaded at the distribution center 136 with autonomous machines (e.g., via a worker 140) and then deployed to the task area 102. In other embodiments, not shown in FIG. 1, other task robots and task tools can be located in other base station pods or at the distribution center 136.

One or more of the task robots 124, the task tools 128 and/or the base station pod 132 may be operably connected for computer communication with one another using, for example, network(s) 118. For example, as will be discussed in detail with FIGS. 7 and 8, one or more of the task robots 124 and/or task tools 128 may be operably connected for robot-to-robot (R2R) communication, creating, for example, a mesh network with the task robots 124 and or the task tools 128 associated with the base station pod 132. Further, the one or more of the task robots 124 and/or task tools 128 may be operably connected for computer communication with task robots and/or task tools (not shown) that are associated with another base station pod (not shown) or not associated with any base station pod. In some embodiments, the base station pod 132 may be operatively connected for computer communication with other base station pods (not shown). Thus, the task robots 124, the task tools 128, and the base station pod 132 may communicate with other workforce entities for efficient evaluation and performance of tasks.

A. Detailed System Components

Figure 2:
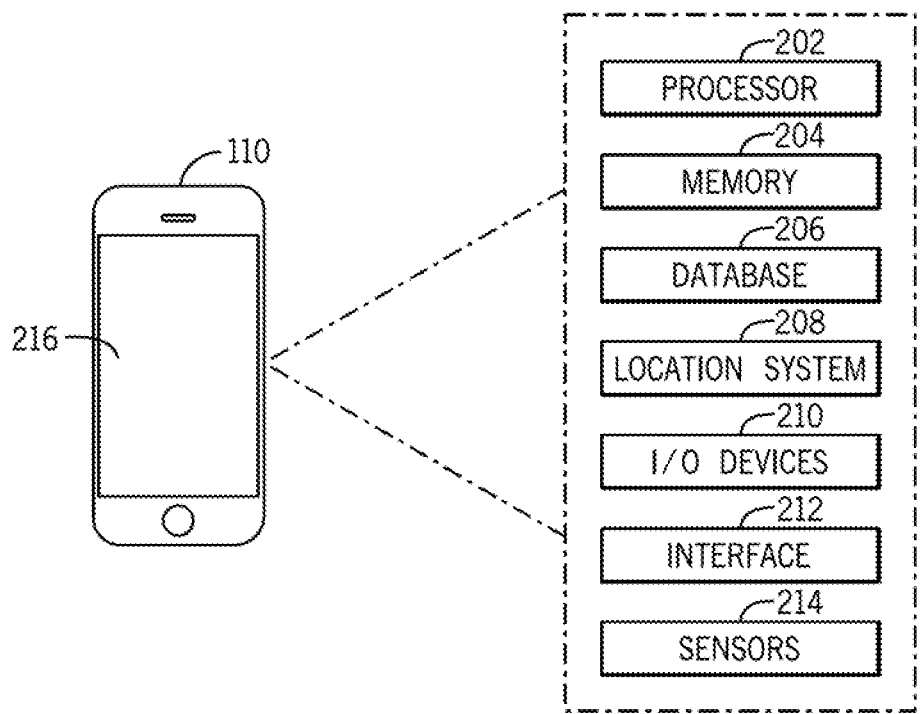
FIG. 2 is a block diagram of the requesting device of FIG. 1 according to an exemplary embodiment.

FIG. 1 will now be described in more detail with respect to FIGS. 2-9. For convenience, like components are denoted by like numerals. The components discussed herein, as well as the components of other systems, hardware architectures, and software architectures discussed herein, may be combined, omitted, or organized into different architectures for various embodiments. Thus, the components and devices described with FIGS. 2-9 may also include other hardware and software components not shown Referring now to FIG. 2, a block diagram of the requesting device 110 of FIG. 1 is shown. The requesting device 110 may be any type of mobile or portable device as described herein, for example, a smart phone. The requesting device 110 may be associated with and/or possessed by the user 108. The requesting device 110 may transmit a service request to the task server system 122 for a workforce solution, for example, to complete a specific task and/or to evaluate the task area 102 to determine a task. In FIG. 2, the requesting device 110 includes a requesting device processor 202, a requesting device memory 204, a requesting device database 206, a requesting device location system 208, a requesting device input/output (I/O) device 210, a requesting device interface 212, and requesting device sensors 214, each of which are operably connected for computer communication via wired and/or wireless technologies described herein.

The requesting device processor 202 may include logic circuitry with hardware, firmware, and software architecture frameworks. Thus, in some embodiments, the processor 202 may store application frameworks, kernels, libraries, drivers, application program interfaces, among others, to execute and control hardware and functions discussed herein. In some embodiments, the requesting device processor 202 may include applications for controlling and/or interacting with one or more of the devices 116. In some embodiments, the requesting device memory 204 and/or the requesting device database 206 may store same or similar components as the requesting device processor 202 for execution by the requesting device processor 202.

The requesting device location system 208 may include hardware (e.g., sensors) and software to determine and/or acquire location, position, and/or orientation data about the requesting device 110. For example, the requesting device location system 208 may include a global positioning system (GPS) unit (not shown) and/or an inertial measurement unit (IMU) (not shown). The requesting device location system 208 may provide a geoposition of the requesting device 110 based on satellite data from, for example, a global position source (not shown), or from any Global Navigational Satellite infrastructure (GNSS), including GPS, Glonass (Russian) and/or Galileo (European). The request device location system 208 may also provide orientation, tilt, velocity, and other position data from, for example, gyroscopes, accelerometers, orientation sensors, and tilt sensors, among others. In some embodiments, the requesting device location system 208 may also provide route finding and directions.

The requesting I/O devices 210 may include input interfaces that may receive input from a user (e.g., the user 108) for example, a keyboard, a touch screen, among others. The requesting I/O devices 210 may also include output interfaces that output and/or display information, for example, a display device, a visual device, a light-emitting diode display, a touch screen, among others. A single component, such as a touch screen, may function as both an input and output interface. In FIG. 2, the touchscreen 216 may function as a requesting I/O device 210.

The requesting device interfaces 212 may include software and hardware to facilitate data input and output between the components of the requesting device 110 and other components of the workforce system 100. Specifically, the requesting device interfaces 212 may include network interface controllers (not shown) and other hardware and software that manages and/or monitors connections and controls bi-directional data transfer between the requesting device interfaces 212, other components of the requesting device 110, and other components of the workforce system 100, for example, the smart home network 112, the network (s) 118, and the task server system 122.

Generally, the requesting device sensors 214 discussed herein sense and measure a stimulus (e.g., a signal, a property, a measurement, a quantity) associated with the requesting device 110 and/or an environment surrounding the requesting device 110, which may include, the task area 102 and/or the user 108. The requesting device sensors 214 may generate a data stream and/or a signal representing the stimulus, analyze the signal and/or transmit the signal to another component, for example, the processor 202. The requesting device sensors discussed herein may include one sensor, more than one sensor, groups of sensors, and may be part of larger sensing systems, for example, monitoring systems, the requesting device location system 208. The sensors may be in various configurations and may include different types of sensors, for example, electric current/ potential sensors (e.g., proximity, inductive, capacitive, electrostatic), acoustic sensors, subsonic, sonic, and ultrasonic sensors, vibration sensors (e.g., piezoelectric) visual sensors, imaging sensors, thermal sensors, temperature sensors, pressure sensors, photoelectric sensors, among others. Further, the requesting device sensors 214 may include one or more of the sensors 900 described in FIG. 9.

Figure 3:
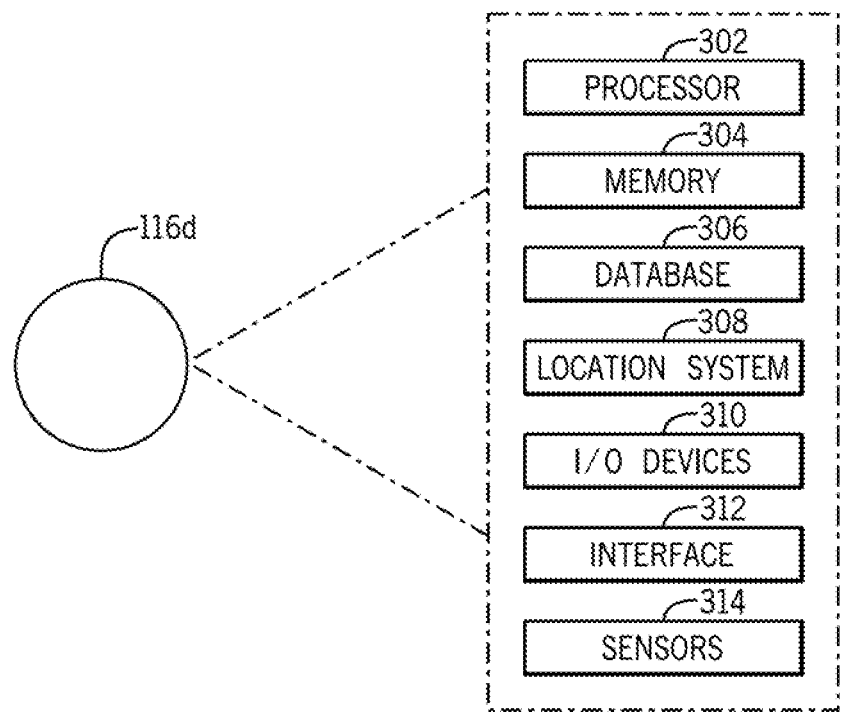
FIG. 3 is a block diagram of the hub device of FIG. 1 according to an exemplary embodiment.

Referring now to FIG. 3, a block diagram of the hub device 116*d* is shown, however, all or some of the components described in FIG. 3 may also be implemented with any of the devices 116. Thus, for example, the device 116*a*, the device 116*b*, and the device 116*c* may include some or all of the components of the hub device 116*d*. In FIG. 3, the hub device 116*d* includes a hub device processor 302, a hub device memory 304, a hub device database 306, a hub device location system 308, hub device input/output (I/O) devices 310, hub device interfaces 312, and hub device sensors 314.

The hub device processor 302 may include logic circuitry with hardware, firmware, and software architecture frameworks. Thus, in some embodiments, the hub device processor 302 may store application frameworks, kernels, libraries, drivers, application program interfaces, among others, to execute and control hardware and functions discussed herein. In some embodiments, the hub device processor 302 may include applications to provide intelligent sensing of the structure 104, objects and/or biological beings inside or outside of the structure 104, and intelligent control of one or more devices and/or features of the structure 104. In some embodiments, the hub device memory 304 and/or the hub device database 306 may store same or similar components as the hub device processor 302 for execution by the hub device processor 302.

The hub device location system 308 may include hardware (e.g., sensors) and software to determine and/or acquire location, position, and/or orientation data about the hub device 116d. For example, the hub device location system 308 may include a global positioning system (GPS) unit (not shown) and/or an inertial measurement unit (IMU) (not shown). The hub device location system 308 may provide a geoposition of the hub device 116d based on satellite data from, for example, a global position source (not shown), or from any Global Navigational Satellite infrastructure (GNSS), including GPS, Glonass (Russian) and/or Galileo (European). The hub device location system 308 may also provide orientation, tilt, velocity, and other position data from, for example, gyroscopes, accelerometers, orientation sensors, and tilt sensors, among others. In some embodiments, the hub device location system 308 may also provide route finding and directions.

The hub device I/O devices 310 may include input interfaces that may receive input from a user for example, a keyboard, a touch screen, among others. The hub device I/O devices 310 may also include output interfaces that output and/or display information, for example, a display device, a visual device, a light-emitting diode display, a touch screen, among others. A single component, such as a touch screen, may function as both an input and output interface.

The hub device interfaces 312 may include software and hardware to facilitate data input and output between the components of the hub device 116d and other components of the workforce system 100. Specifically, the hub device interfaces 312 may include network interface controllers (not shown) and other hardware and software that manages and/or monitors connections and controls bi-directional data transfer between the hub device interfaces 312, other components of the hub device 166-D, and other components of the workforce system 100, for example, the smart home network 112, the network(s) 118, the third party server system 120, and the task server system 122.

Generally, the hub device sensors 314 discussed herein sense and measure a stimulus (e.g., a signal, a property, a measurement, a quantity) associated with the hub device 116d and/or an environment surrounding the hub device 116d, which may include, the task area 102 and/or the user 108. The hub device sensors 314 may generate a data stream and/or a signal representing the stimulus, analyze the signal and/or transmit the signal to another component, for example, the hub device processor 302. The hub device sensors 314 discussed herein may include one sensor, more than one sensor, groups of sensors, and may be part of larger sensing systems, for example, monitoring systems, the hub device location system 308. The may be in various configurations and may include different types of sensors, for example, electric current/potential sensors (e.g., proximity, inductive, capacitive, electrostatic), acoustic sensors, subsonic, sonic, and ultrasonic sensors, vibration sensors (e.g., piezoelectric) visual sensors, imaging sensors, thermal sensors, temperature sensors, pressure sensors, photoelectric sensors, among others. Further, the hub device sensors 314 may include one or more of the sensors 900 described in FIG. 9.

Figure 4:
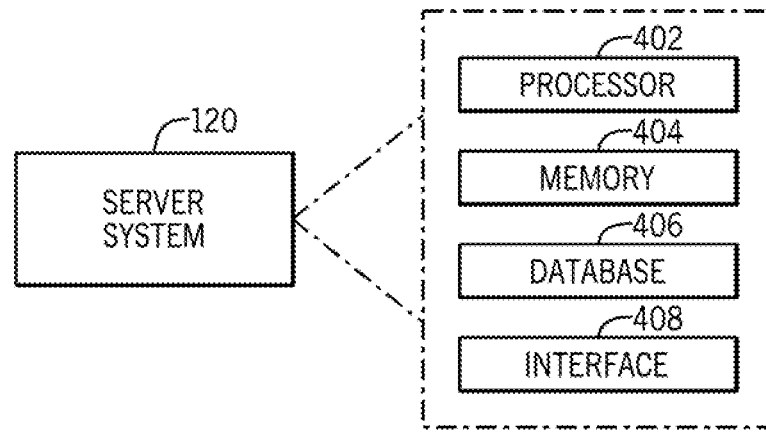
FIG. 4 is a block diagram of the third party server system of FIG. 1 according to an exemplary embodiment.

Referring now to FIG. 4, a block diagram of the third party server system 120 according to one embodiment is shown. The third party server system 120 includes a third party processor 402, a third party memory 404, a third party database 406, and third party interfaces 408. The third party processor 402 may include logic circuitry with hardware, firmware, and software architecture frameworks. Thus, in some embodiments, the third party processor 402 may store application frameworks, kernels, libraries, drivers, application program interfaces, among others, to execute and control hardware and functions discussed herein. In some embodiments, the third party processor 402 may include applications for communicating and/or controlling one or more of the devices 116. In some embodiments, the third party memory 404 and/or the third party database 406 may store same or similar components as the third party processor 402 for execution by the third party processor 402.

The third party interfaces 412 may include software and hardware to facilitate data input and output between the components of the third party server system 120 and other components of the workforce system 100. Specifically, the third party interfaces 412 may include network interface controllers (not shown) and other hardware and software that manages and/or monitors connections and controls bi-directional data transfer between the third party interface 412, other components of the third party server system 120, and other components of the workforce system 100, for example, the smart home network 112, the devices 116, the network(s) 118, and the task server system 122.

Figure 5:
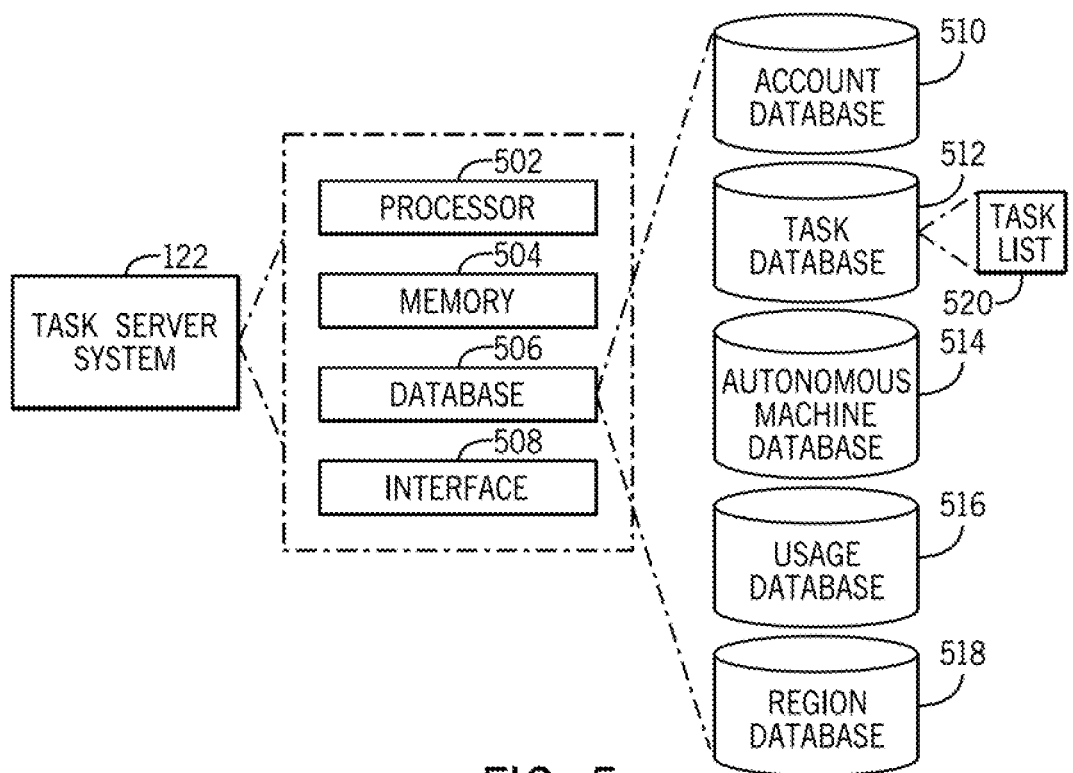
FIG. 5 is a block diagram of the task server system of FIG. 1 according to an exemplary embodiment.

Referring now to FIG. 5, a block diagram of the task server system 122 is shown according to an exemplary embodiment. The task server system 122 includes a task processor 502, a task memory 504, a task server database 506, and task interfaces 508. The task processor 502 may include logic circuitry with hardware, firmware, and software architecture frameworks. Thus, in some embodiments, the task processor 502 may store application frameworks, kernels, libraries, drivers, application program interfaces, among others, to execute and control hardware and functions discussed herein. In some embodiments, the task processor 502 may include applications for communicating and/or controlling the task robots 124, the task tools 128, and/or the base station pod 132. In some embodiments, the task memory 504 and/or the task server database 506 may store same or similar components as the task processor 502 for execution by the task processor 502.

The task interfaces 508 may include software and hardware to facilitate data input and output between the components of the task server system 122 and other components of the workforce system 100. Specifically, the task interfaces 508 may include network interface controllers (not shown) and other hardware and software that manages and/or monitors connections and controls bi-directional data transfer between the task interface 508, other components of the task server system 122, and other components of the workforce system 100, for example, the network(s) 118, the task robots 124, the task tools 128, the base station pod 132, and/or the distribution center 136.

As mentioned above, the task server database 506 may include one or more databases and/or data stores. In FIG. 5, the task server database 506 includes an account database 510, a task database 512, an autonomous machine database 514, a usage database 516, and a region database 518. The task server database 506 may include other data stores not mentioned herein and/or one of the aforementioned data stores may be combined into any configuration. The account database 510 may store account information about the user 108, the requesting device 110 and/or the structure 104. For example, user profile information, preferences, billing information, among others. The task database 512 may store information about tasks that may be used to determine tasks and execute tasks. The autonomous machine database 514 may store information about each of the task robots 124 and/or the task tools 126. For example, a robot identification code, location history, capabilities, attachments, maintenance history, task history, among others. The usage database 516 may store information about electricity, gas, water, heating and cooling, among others about one or more users 108. In some embodiment, this usage data may be accessed using an application programming interface to one or more entities, for example, a municipal database. Referring again to FIG. 5, the region database 518 may store data related to autonomous mobile workforce applied to a particular area (e.g., municipality, street).

Figure 6:
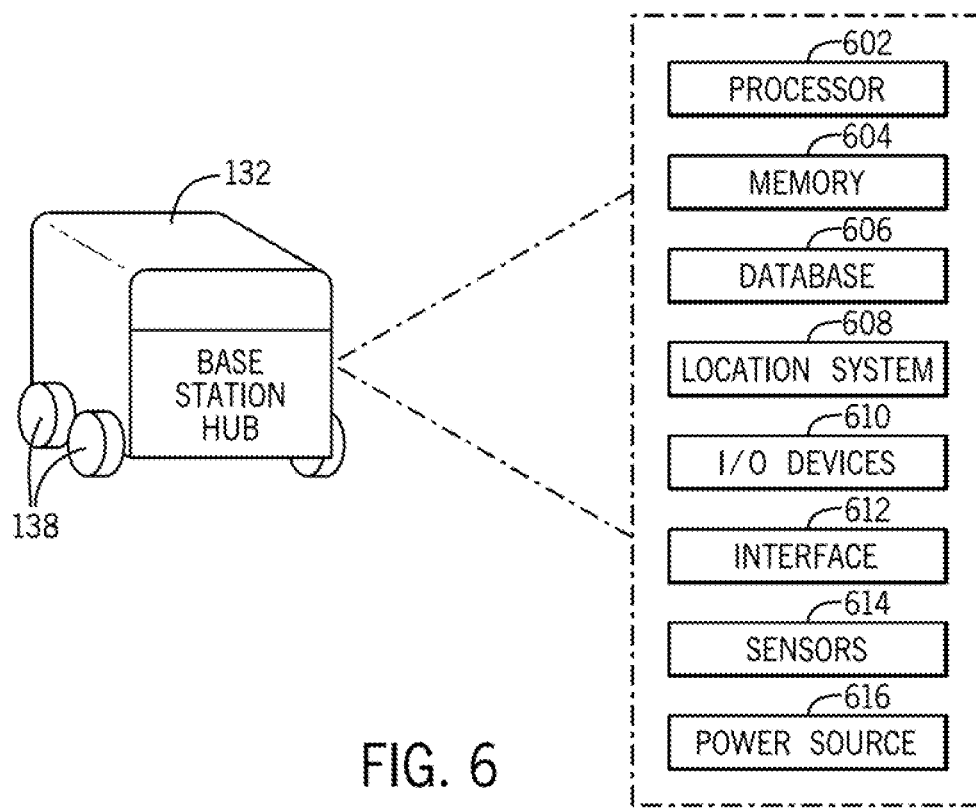
FIG. 6 is a block diagram of the base station pod of FIG. 1 according to an exemplary embodiment.

Referring now to FIG. 6, a block diagram of a base station pod 132 according to an exemplary embodiment is shown. As mentioned above, the base station pod 132 may provide storage and charging for one or more of the task robots 124 and one or more of the task tools 128. Thus, the base station pod 132 is capable of receiving one or more of the task robots 124 and one or more of the task tools 128 (e.g., docking) and is capable of monitoring and/or charging same. The base station pod 132 includes a pod processor 602, a pod memory 604, a pod database 606, a pod location system 608, pod input/output (I/O) devices 610, pod interfaces 612, pod sensors 614, and a pod power source 616.

The pod processor 602 may include logic circuitry with hardware, firmware, and software architecture frameworks. Thus, in some embodiments, the processor 602 may store application frameworks, kernels, libraries, drivers, application program interfaces, among others, to execute and control hardware and functions discussed herein. In some embodiments, the pod processor 602 may include applications for controlling one or more of the task robots 124 and/or one or more of the task tools 128. In some embodiments, the pod memory 604 and/or the pod database 606 may store same or similar components as the pod processor 602 for execution by the pod processor 602.

The pod location system 608 may include hardware (e.g., sensors) and software to determine and/or acquire position data about the base station pod 132. For example, the pod location system 608 may include a global positioning system (GPS) unit (not shown) and/or an inertial measurement unit (IMU) (not shown). The pod location system 608 may provide a geoposition of the base station pod 132 based on satellite data from, for example, a global position source (not shown), or from any Global Navigational Satellite infrastructure (GNSS), including GPS, Glonass (Russian) and/or Galileo (European). The pod location system 608 may also provide orientation, tilt, velocity, and other position data from, for example, gyroscopes, accelerometers, orientation sensors, and tilt sensors, among others. In some embodiments, the pod location system 608 may also provide route finding and directions. For example, in one embodiment, delivery and/or pick-up of the base station pod 132 is facilitated by the pod location system 608.

The pod I/O devices 610 may include input interfaces that may receive input from a user for example, a keyboard, a touch screen, among others. The pod I/O devices 610 may also include output interfaces that output and/or display information, for example, a display device, a visual device, a light-emitting diode display, a touch screen, among others. A single component, such as a touch screen, may function as both an input and output interface.

The pod interfaces 612 may include software and hardware to facilitate data input and output between the components of the base station pod 132 and other components of the workforce system 100. Specifically, the pod interfaces 612 may include network interface controllers (not shown) and other hardware and software that manages and/or monitors connections and controls bi-directional data transfer between the pod interfaces 612, other components of the base station pod 132, and other components of the workforce system 100, for example, the network(s) 118, the task robots 124, the task tools 128, and the task server system 122.

Generally, the pod sensors 614 discussed herein sense and measure a stimulus (e.g., a signal, a property, a measurement, a quantity) associated with the base station pod 132, an environment surrounding the base station pod 132, and/or an environment within the base station pod 132, which may include, the task area 102, that task robots 124, and/or the task tools 128. The pod sensors 614 may generate a data stream and/or a signal representing the stimulus, analyze the signal and/or transmit the signal to another component, for example, the pod processor 602. The pod sensors 614 discussed herein may include one sensor, more than one sensor, groups of sensors, and may be part of larger sensing systems, for example, monitoring systems, the requesting device location system 208. Further, the pod sensors 614 may include one or more of the sensors 900 described in FIG. 9. The sensors may be in various configurations and may include different types of sensors, for example, electric current/potential sensors (e.g., proximity, inductive, capacitive, electrostatic), acoustic sensors, subsonic, sonic, and ultrasonic sensors, vibration sensors (e.g., piezoelectric) visual sensors, imaging sensors, thermal sensors, temperature sensors, pressure sensors, photoelectric sensors, among others.

As mentioned above, the base station pod 132 also includes the power source 616 which may be used to power or charge one or more of the task robots 124 and/or the task tools 128. In some embodiments, the power source 616 may be used to power or charge the base station pod 132 itself (e.g., solar panels). For example, the power source 616 may include one or more batteries or other types of rechargeable sources. The power source 616 typically converts one type of electrical power to another. However, the power source 616 may also convert a different form of energy, for example, solar, mechanical, and chemical, into electrical energy.

Figure 7:
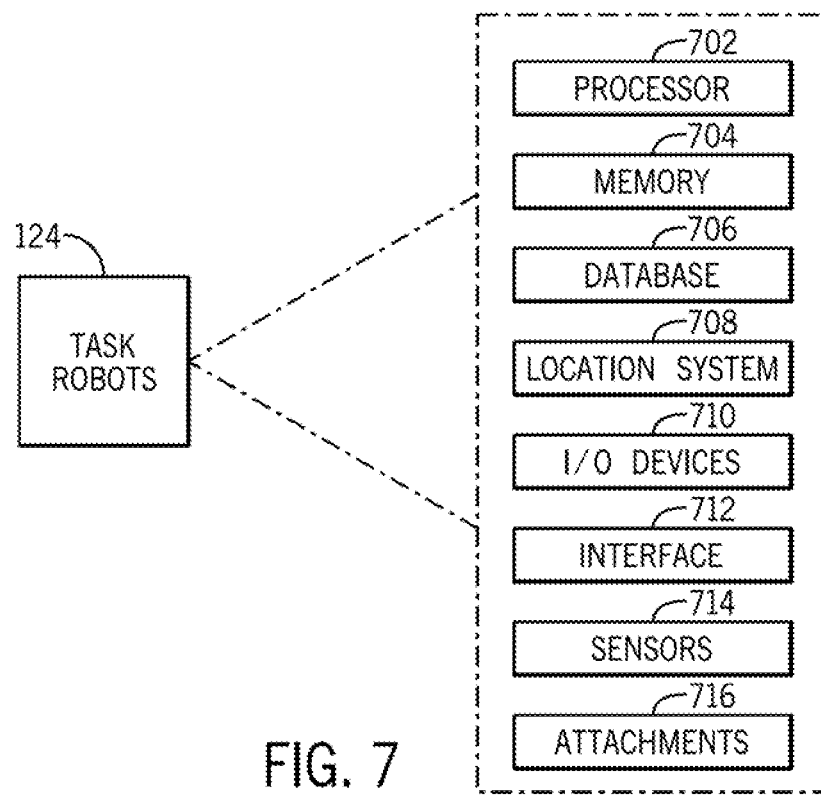
FIG. 7 is a block diagram of the task robots of FIG. 1 according to an exemplary embodiment.

Referring now to FIG. 7, a block diagram of a task robot 124, for example, the UAV 126a and/or the autonomous vehicle 126b according to an exemplary embodiment is shown. The task robot 124 includes a robot processor 702, a robot memory 704, a robot database 706, a robot location system 708, robot input/output (I/O) devices 710, robot interfaces 712, robot sensors 714, and task attachments 716. The robot processor 702 may include logic circuitry with hardware, firmware, and software architecture frameworks. Thus, in some embodiments, the robot processor 702 may store application frameworks, kernels, libraries, drivers, application program interfaces, among others, to execute and control hardware and functions discussed herein. In some embodiments, the robot memory 704 and/or the robot database 706 may store same or similar components as the robot processor 702 for execution by the robot processor 702.

The robot location system 708 may include hardware (e.g., sensors) and software to determine and/or acquire location, position, and/or orientation data about the task robot 124. For example, the robot location system 708 may include a global positioning system (GPS) unit (not shown) and/or an inertial measurement unit (IMU) (not shown). The requesting device location system 208 may provide a geoposition of the task robot 124 based on satellite data from, for example, a global position source (not shown), or from any Global Navigational Satellite infrastructure (GNSS), including GPS, Glonass (Russian) and/or Galileo (European). The robot location system 708 may also provide orientation, tilt, velocity, and other position data from, for example, gyroscopes, accelerometers, orientation sensors, and tilt sensors, among others. In some embodiments, the robot location system 708 may also provide route finding and directions.

The robot I/O devices 710 may include input interfaces that may receive input from a user for example, a keyboard, a touch screen, among others. The robot I/O devices 710 may also include output interfaces that output and/or display information, for example, a display device, a visual device, a light-emitting diode display, a touch screen, among others. A single component, such as a touch screen, may function as both an input and output interface.

The robot interfaces 712 may include software and hardware to facilitate data input and output between the components of the task robots 124 and other components of the workforce system 100. Specifically, the robot interfaces 712 may include network interface controllers (not shown) and other hardware and software that manages and/or monitors connections and controls bi-directional data transfer between the robot interfaces 712, other components of the task robots 124, and other components of the workforce system 100, for example, the network(s) 118, the base station pod 132, and the task server system 122.

Generally, the robot sensors 714 discussed herein sense and measure a stimulus (e.g., a signal, a property, a measurement, a quantity) associated with the task robot 124 and/or an environment surrounding the task robot 124, which may include, the task area 102, other robots, the task tools 126, among others. The robot sensors 714 may generate a data stream and/or a signal representing the stimulus, analyze the signal and/or transmit the signal to another component, for example, the robot processor 702. The robot sensors 714 discussed herein may include one sensor, more than one sensor, groups of sensors, and may be part of larger sensing systems, for example, monitoring systems, the robot location system 708. Further, the robot sensors 714 may include one or more of the sensors 900 described in FIG. 9. The sensors may be in various configurations and may include different types of sensors, for example, electric current/potential sensors (e.g., proximity, inductive, capacitive, electrostatic), acoustic sensors, subsonic, sonic, and ultrasonic sensors, vibration sensors (e.g., piezoelectric) visual sensors, imaging sensors, thermal sensors, temperature sensors, pressure sensors, photoelectric sensors, among others.

Referring again to FIG. 7, the task robots 124 may also include task attachments 716. In some embodiments, the task attachments 716 include one or more of the task tools 126, for example, as shown in FIG. 1 by numeral 130, a rake head attachment, a cleaning brush attachment, a vacuum attachment, and a lawn maintenance blade. In some embodiments, the task attachments 716 are integrated with the task robots 124. In other embodiments, the task attachments 716 are detachable from the task robots 124 and may be exchanged with other task attachments 716. It is appreciated that some task attachments 716 may perform multiple functions. For example, a vacuum attachment may also include a cleaning brush function. In some embodiments, the task attachments 716 may have computer functionality (e.g., a smart task tool that is internet-enabled) while other task attachments 716 may not have computer functionality (e.g., dumb or non-internet-enabled physical devices and everyday objects).

Figure 8:
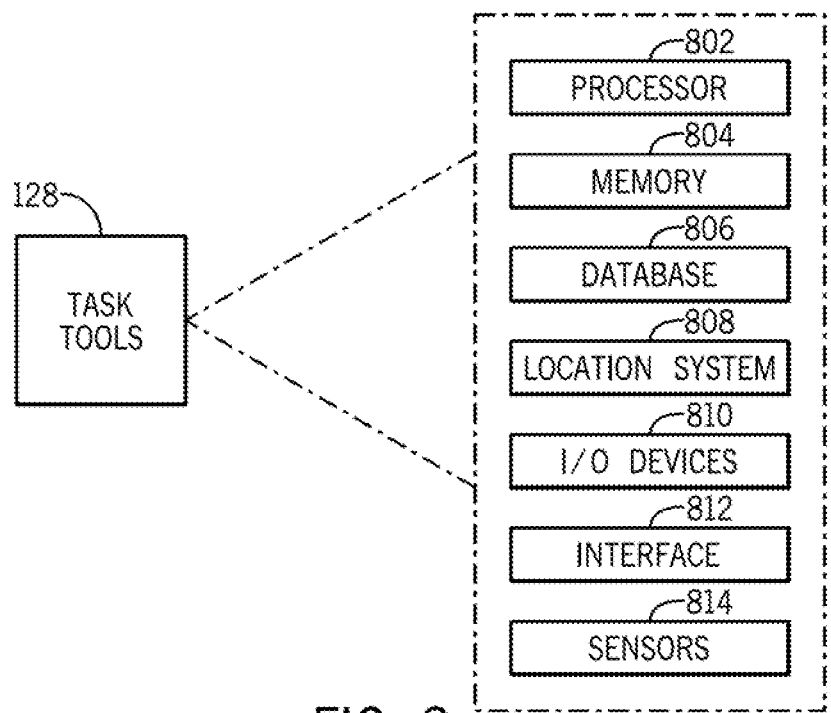
FIG. 8 is a block diagram of the task tools of FIG. 1 according to an exemplary embodiment

Referring now to FIG. 8, an exemplary block diagram of the task tools 128 having computer functionality is shown. In some embodiments, "dumb" task tools may include one or more of the components shown in FIG. 8 (e.g., sensors). FIG. 8 includes a tool processor 802, a tool memory 804, a tool database 806, a tool location system 808, tool I/O devices 810, tool interfaces 812, and tool sensors 814, each of which are operably connected for computer communication via wired and/or wireless technologies described herein.

The tools processor 802 may include logic circuitry with hardware, firmware, and software architecture frameworks. Thus, in some embodiments, the tools processor 802 may store application frameworks, kernels, libraries, drivers, application program interfaces, among others, to execute and control hardware and functions discussed herein. In some embodiments, the tool memory 804 and/or the tool database 806 may store same or similar components as the tool processor 802 for execution by the tool processor 802.

The tool location system 808 may include hardware (e.g., sensors) and software to determine and/or acquire location, position, and/or orientation data about the requesting device 110. For example, the requesting device location system 208 may include a global positioning system (GPS) unit (not shown) and/or an inertial measurement unit (IMU) (not shown). The tool location system 808 may provide a geo-position of the task tools 126 based on satellite data from, for example, a global position source (not shown), or from any Global Navigational Satellite infrastructure (GNSS), including GPS, Glonass (Russian) and/or Galileo (European). The tool location system 808 may also provide orientation, tilt, velocity, and other position data from, for example, gyroscopes, accelerometers, orientation sensors, and tilt sensors, among others. In some embodiments, the tool location system 808 may also provide route finding and directions.

The tool I/O devices 810 may include input interfaces that may receive input from a user (e.g., the user 108) for example, a keyboard, a touch screen, among others. The tool I/O devices 810 may also include output interfaces that output and/or display information, for example, a display device, a visual device, a light-emitting diode display, a touch screen, among others. A single component, such as a touch screen, may function as both an input and output interface.

The tool interfaces 812 may include software and hardware to facilitate data input and output between the components of the task tools 126 and other components of the workforce system 100. Specifically, the tool interfaces 812 may include network interface controllers (not shown) and other hardware and software that manages and/or monitors connections and controls bi-directional data transfer between the tool interfaces 812, other components of the task tool 126, and other components of the workforce system 100, for example, the smart home network 112, the network(s) 118, the task robots 124, and the task server system 122.

Generally, the tool sensors 814 discussed herein sense and measure a stimulus (e.g., a signal, a property, a measurement, a quantity) associated with the task tools 126 and/or an environment surrounding the task tools 126, which may include, the task area 102 and/or the task robots 124. The tool sensors 814 may generate a data stream and/or a signal representing the stimulus, analyze the signal and/or transmit the signal to another component, for example, the tool processor 802. The tool sensors 814 discussed herein may include one sensor, more than one sensor, groups of sensors, and may be part of larger sensing systems, for example, monitoring systems, the tool location system 808. Further, the tool sensors 814 may include one or more of the sensors 900 described in FIG. 9. The sensors may be in various configurations and may include different types of sensors, for example, electric current/potential sensors (e.g., proximity, inductive, capacitive, electrostatic), acoustic sensors, subsonic, sonic, and ultrasonic sensors, vibration sensors (e.g., piezoelectric) visual sensors, imaging sensors, thermal sensors, temperature sensors, pressure sensors, photoelectric sensors, among others.

Figure 9:
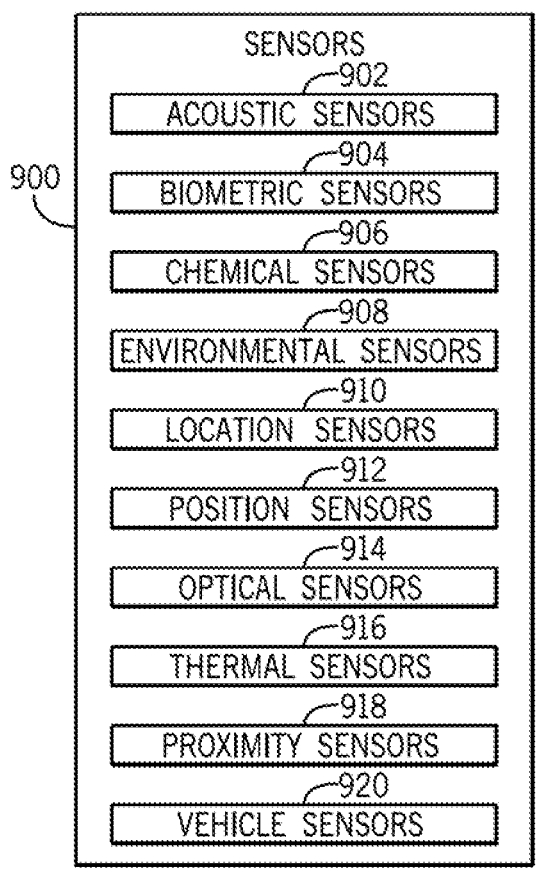
FIG. 9 is a block diagram of exemplary sensors according to an exemplary embodiment.

The sensors described herein will now be discussed in more detail with FIG. 9. FIG. 9 is a block diagram of exemplary sensors 900, one or more of which may be part of the sensors described herein with FIGS. 1-8. In FIG. 9, the sensors 900 includes acoustic sensors 902, biometric sensors 904, chemical sensors 906, environmental sensors 908, location sensors 910, position sensors 912, optical sensors 914, thermal sensors 916, proximity sensors 918, and vehicle sensors 920.

The acoustic sensors 902 may include sound and/or vibration sensors, for example, a microphone, seismometer, among others. The biometric sensors 904 may include any sensors for monitoring a biological being (e.g., the user 108, any biological being within the task area 102), for example, heart rate sensors, blood pressure sensors, oxygen content sensors, blood alcohol sensors, respiratory sensors, eye and/or facial movement sensors, brain monitoring sensors, pupil dilation sensors, among others. The chemical sensors 906 may include carbon dioxide sensors, carbon monoxide sensors, hydrogen sensors, smoke detectors, among others. The environmental sensors 908 may include weather sensors, moisture sensors, humidity sensors, snow sensors, soil moisture sensors, rain sensors, air pollution sensors, among others.

The location sensors 910 may include gyroscopes, inertial navigation sensors, yaw rate sensors, altimeters, among others. The position sensors 912 may include flex sensors, impact sensors, acceleration sensors, speed sensors, distance sensors, tilt sensors, LIDAR, among others. The optical sensors 914 may include light sensors, image sensors, LED sensors, infrared sensors, among others. The thermal sensors 916 may include heat sensors, temperature sensors, among others. The proximity sensors 918 may include radar sensors, occupancy sensors, and motion detectors, among others. The vehicle sensors 920 may include cameras mounted to the interior or exterior of a vehicle (e.g., the vehicle 106), radar and laser sensors mounted to the exterior of the vehicle, external cameras, radar and laser sensors (e.g., on other vehicles in a vehicle-to-vehicle network, street cameras, surveillance cameras). The vehicle sensors 920 may also include brake sensors, blind spot indicator sensors, steering sensors, cruise control sensors, among others. The vehicle sensors 920 may be part of any moving device, for example, the task robots 124.

B. Workforce Architecture Overview

As mentioned above, the components of the workforce system 100 function synergistically for the entire task life cycle from task initiation to task settlement. This provides a seamless and effective autonomous mobile workforce experience. The functions of the workforce system 100 will now be described with reference to FIG. 10, which illustrates a high-level overview of workforce architecture 1000. One or more components of the workforce architecture 1000 may be implemented as software and/or hardware with one or more of the components of FIG. 1. For example, one or more of the components of FIG. 10 may include logic circuitry with hardware, firmware, and software architecture frameworks, stored at the requesting device processor 202, the third party processor 402, the task processor 502, the pod processor 602, the robot processor 702, and/or any other component of FIG. 1. Accordingly, the workforce architecture 1000 may be distributed among more than one component in FIG. 1, for example, a processor, a memory, and/or a database of more than one component in FIG. 1 and as described in detail with FIGS. 2-9. This allows for a synergistic execution of the systems and methods discussed herein from more than one component of the workforce system 100.

Figure 10:
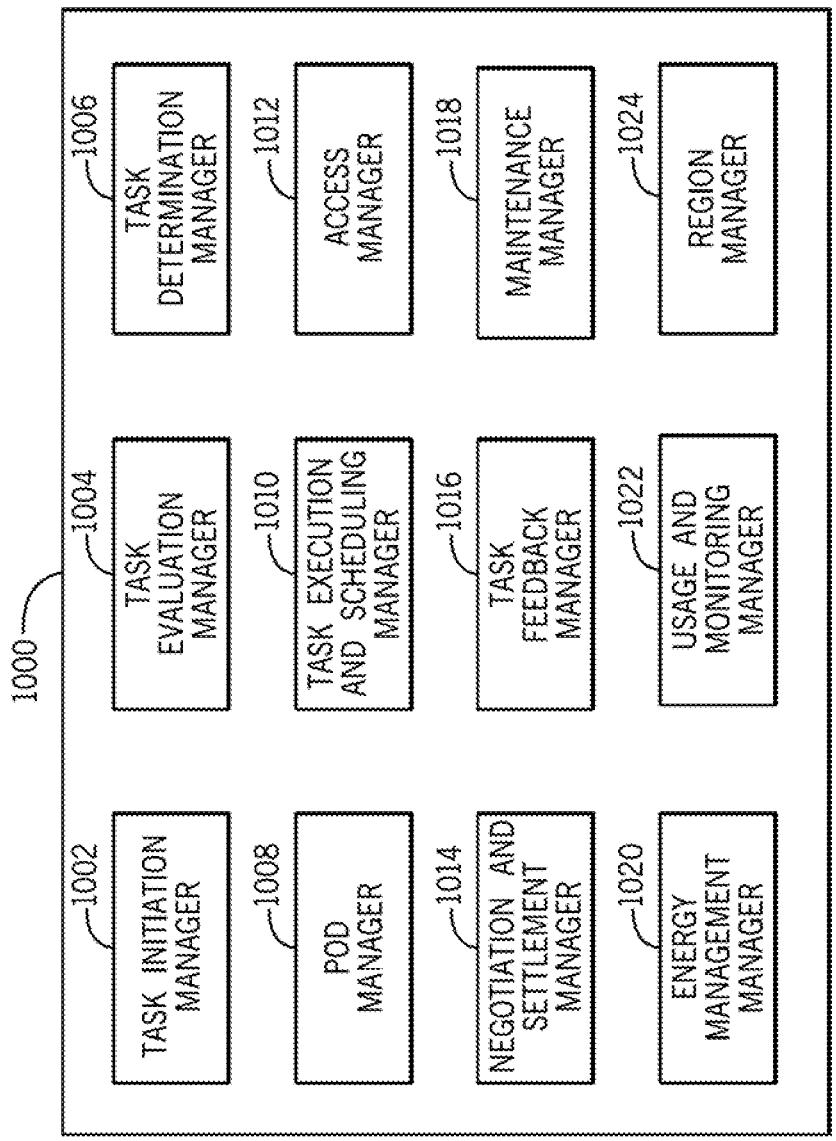
FIG. 10 is a high-level block diagram of an exemplary workforce architecture according to an exemplary embodiment.

In FIG. 10, the workforce architecture 1000 may include, but is not limited to, a task initiation manager 1002, a task evaluation manager 1004, a task determination manager 1006, a pod manager 1008, a task execution and scheduling manager 1010, an access manager 1012, a negotiation and settlement manager 1014, a task feedback manager 1016, a maintenance manager 1018, an energy manager 1020, a usage and monitoring manager 1022, and a region manager 1024. Each of the above mentioned components of FIG. 10 will now be discussed briefly and then fully described in Section III. The task initiation manager 1002 is configured to facilitate the initiation of one or more tasks associated with the task area 102 and/or the requesting device 110. In one embodiment, the requesting device 110 initiates one or more tasks. For example, the user 108 may provide user input to the requesting device 110 thereby transmitting a request for a specific task to be performed and/or a request an evaluation for a task to be performed via, for example, the requesting device I/O devices 210. In other embodiments, the requesting device 110, one or more of the devices 116, and/or the task server system 122 may trigger the initiation of a task without input from the user 108 (e.g., based on task prediction, task schedules).

Referring again to FIG. 10, the task evaluation manager 1004 is configured to control evaluation of the task area 102. For example, the task and server system 122 using the task evaluation manager 1004 may control the UAV 126$a$ to travel (e.g., from the base station pod 132) to the task area 102 to collect data about the task area 102. The task and server system 122 may use the data to then determine one or more tasks and/or sub-tasks. In other embodiments, the task evaluation manager 1004 is configured to evaluate the task area 102 to determine whether a particular task is complete and/or evaluate the quality of the task performed.

The task determination manager 1006 is configured to determine one or more tasks to be completed for the task area 102. As will be discussed herein, evaluation data (e.g., obtained by the task evaluation manager 1004) and the task database 512 are utilized to determine one or more tasks. In some embodiments, the task and server system 122 using the pod manager 1008 communicates with the distribution center 136 and/or the delivery worker 140 (e.g., via a portable device (not shown) and/or to the delivery worker 140 itself when the delivery worker 140 is a humanoid) to equip a base station pod (e.g., the base station pod 132) with the task robots 124 and/or the task tools 128 needed for the one or more determined tasks. Further, the base station pod 132 is controlled for autonomous drop-off and/or pickup. Thus, the base station pod 132 can travel using the wheels 138 from the distribution center 136 to the task area 102 (i.e., drop-off) and/or can travel using the wheels 138 from the task area 102 to the distribution center 136 (i.e., pickup).

The task execution and scheduling manager 1010 is configured to facilitate performance and completion of one or more tasks in conjunction with the base station pod 132, the task robots 124, and the task tools 128. For example based on the task, one or more task robots 124 and/or one or more task tools 128 are deployed to the task area 102. As the task is being performed, real-time data from the task robots 124, the task tools 128, and/or the devices 116 is transmitted to the task server system 122. Using the real-time data, the task server system 122 confirms when tasks are completed and may control the task robots 124 and/or the task tools 128 to switch to another task and/or return to the base station pod 132. In other embodiments, the task evaluation manager 1004 deploys the UAV 126a to re-evaluate the task area 102 to collect evaluation data and determine whether a task has been completed.

The access manager 1012 facilitates providing secure and accurate access to the task area 102 for execution of the task. For example, the access manager 1012 may provide an access code for a locked mechanism (e.g., allowing access to the task area 102) to the task robots 124 upon validating that the task robot 124 has privileges to access the task area 102. The negotiation and settlement manager 1014 is configured to facilitate the payment terms for the tasks and settle the financial transaction, typically with the requesting device 110. As will be discussed herein, the negotiation and settlement manager 1014 may implement dynamic pricing based on the tasks to be completed and other factors which will be described in more detail herein. Additionally, at the completion of a task and/or in parallel with task payment, the task feedback manager 1016 is configured to capture data from the user 108, the requesting device 110, and/or the devices 116 about the tasks performed. Task processes may be improved upon by applying the feedback to machine learning techniques.

The maintenance manager 1018 is configured to manage maintenance and repair of the task robots 124 and the task tools 128. Using data from the task robots 124, the task tools 128, and the base station pod 132, the maintenance manager 1018 may determine, predict, and track maintenance issues, repairs, and routine maintenance. Further, the maintenance manager 1018 may coordinate (e.g., with the base station pod 132, the distribution center 136, and/or the pod manager 1008) the pickup, delivery, and exchange of the task robots 124 and the task tools 128 for repair. Further, the task server system 122 may utilize the energy manager 1020 to monitor energy usage and control energy replenishment (e.g., charging). For example, as discussed above, the base station pod 132 includes the power source 616. The energy manager 1020 is configured to monitor the power source 616 and/or the power sources of the task robots 124 and the task tools 126. For example, charging level and charging parameters.

In some embodiments, the usage and monitoring manager 1022 is configured to socially group and/or aggregate like users, structures, and/or task areas to compare consumption or usage of a particular good or commodity. For example, water consumption or energy consumption. The usage and monitoring manager 1022 may use these comparisons to influence user action and/or to generate task predictions and/or suggestions. Further, in some embodiments, the task and server system 122 may control the workforce system 100 according to a particular region, for example, a municipality, a street, a home owner's association, among others, using the region manager 1024.

III. Methods for Autonomous Mobile Workforce

Exemplary methods for the management and execution of an autonomous mobile workforce will now be discussed in detail with reference to FIGS. 11-21 and with further reference to the components of FIGS. 1-10 discussed above. As mentioned above, the autonomous mobile workforce system 100 includes several components that work in concert to execute tasks efficiently and autonomously. As used herein, a task is a work to be done or a unit of work. Some tasks may also include sub-tasks that are work to be done in order to complete the primary or parent task. Each task may have one or more attributes, which are properties or characteristics of the task. As an illustrative example, a task may be a lawn care task. Sub-tasks of the lawn care task may include mowing, trimming, and edging. An exemplary attribute of the mowing sub-task is grass length (see FIG. 12C).

The task definitions including the tasks and/or sub-tasks may be defined and/or stored by the task database 512. Furthermore, a task list 520 may be generated for execution at the task area 102 using the task database 512. A task may be of any variety including, but not limited to, cleaning tasks, maintenance tasks, landscaping tasks, domestic tasks, assistance tasks, emergency response tasks (e.g., fire control, rescue operations), construction tasks, assembly tasks, labor tasks, design tasks, and quality assurance tasks, among others. Tasks related to lawn care management and home cleaning will be discussed with the examples herein, however, any type or variety of task may be contemplated with the examples.

A. Task Initiation, Evaluation, and Determination

Figure 11:
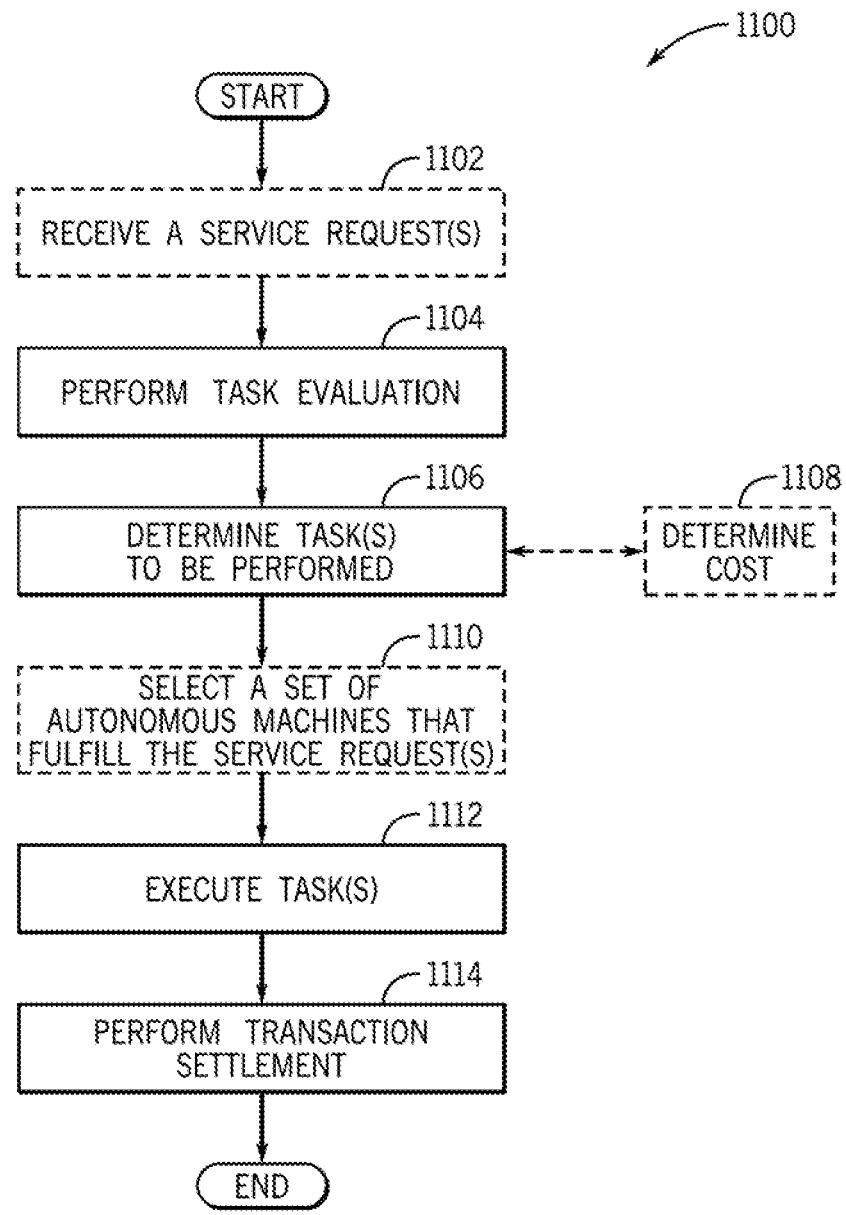
FIG. 11 is a process flow diagram of a method for autonomous mobile workforce according to an exemplary embodiment.

Referring now to FIG. 11, a method 1100 describes the operations of one or more components shown in FIG. 1, for example, the operations of the task server system 122 for operating an autonomous mobile workforce. At block 1102, the method 1100 includes receiving a service request(s). In one embodiment, the task processor 502 executes block 1102 using, for example, the task initiation manager 1002. The service request may include a task (e.g., as defined by the task database 512) that is associated with the task area 102. In other embodiments, the service request may include at least one of the task and/or information about the task, attributes of the task, the task area 102, the user 108, the requesting device 110, the structure 104, and/or information from the devices 116. As one example, the service request includes at least an identification of the task area 102, and an identification of the user 108 or the requesting device 110. In this example, a specific task is not identified in the service request. In some embodiments, the service request may include a type of task, an originating device (e.g., the requesting device 110, the devices 116), and any other information about the task area 102 and the task to be performed (e.g., task attributes).

In one embodiment, the service request originates from the requesting device 110 and is transmitted to the task and server system 122 using the network(s) 118. In this example, the user 108 may interact with the requesting device 110 to select one or more services (e.g., tasks) and/or task attributes. The services and/or task attributes are communicated as a service request to, for example, the task server system 122. The service request may be communicated from the requesting device 110 to the task and server system 122 using, for example, the requesting device interfaces 212, the task interfaces 508, and the network(s) 118.

Figure 12B:
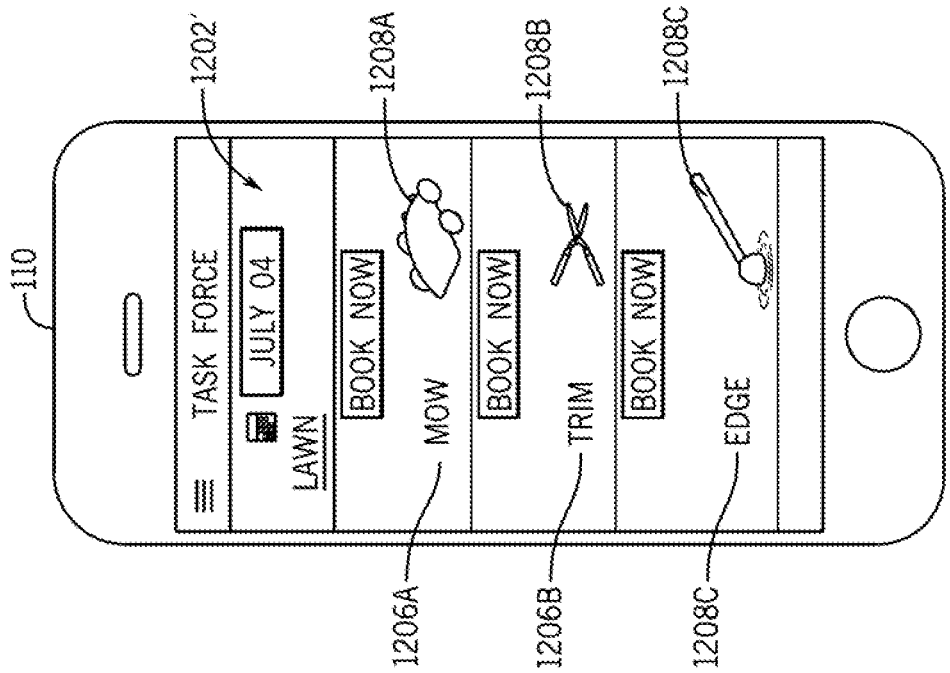
FIG. 12B is a schematic diagram of an exemplary user interface according to another exemplary embodiment.
Figure 12A:
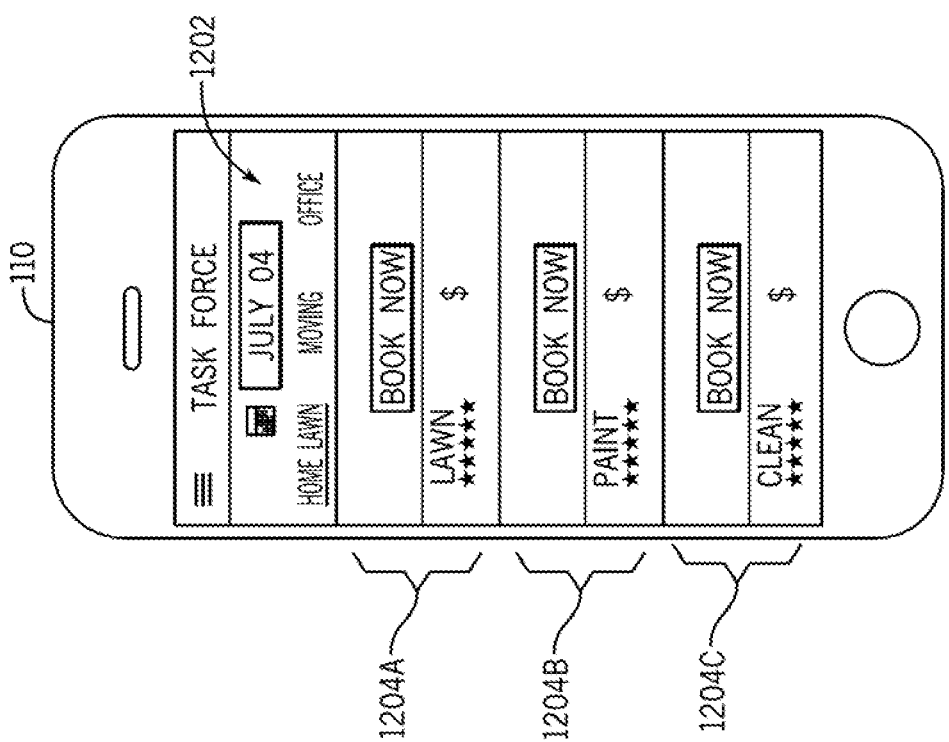
FIG. 12A is a schematic diagram of an exemplary user interface according to an exemplary embodiment.
Figure 12C:
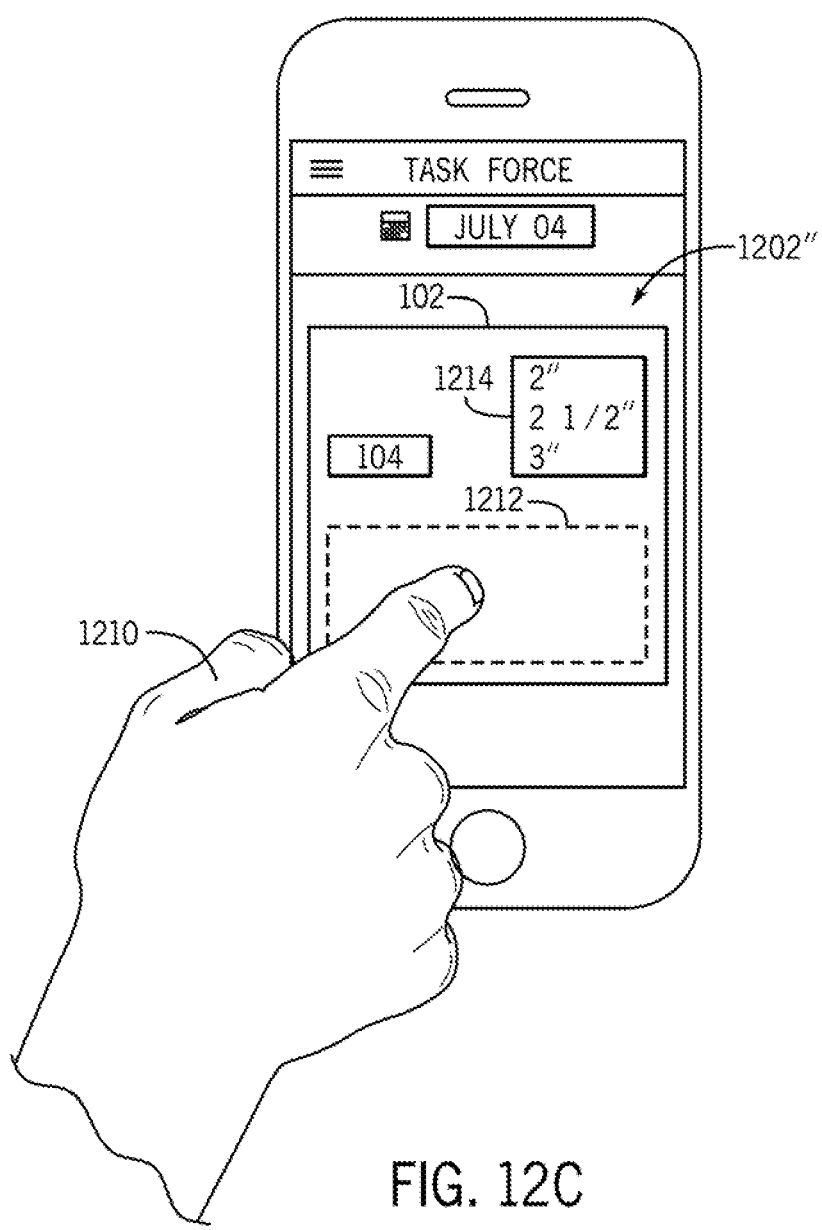
FIG. 12C is a schematic diagram of an exemplary user interface for selecting a task attribute according to another exemplary embodiment.
Figure 13:
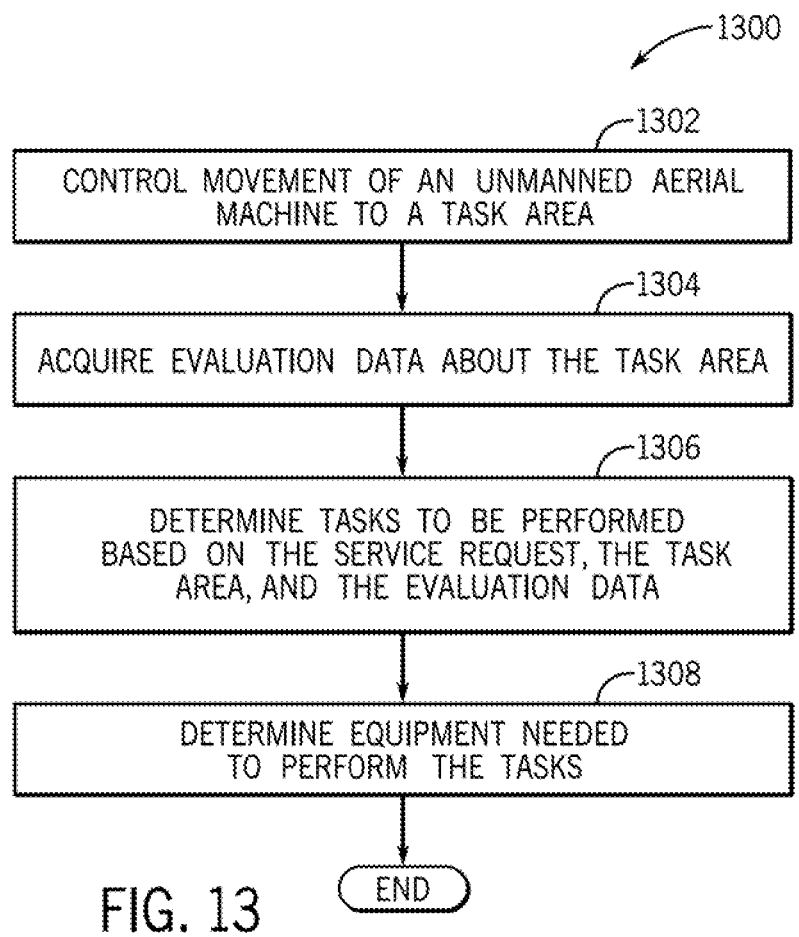
FIG. 13 is a process flow diagram of a method for task evaluation and task determination according to an exemplary embodiment.

FIGS. 12A, 12B, and 12C illustrate exemplary user interfaces displayed on the requesting device 110 (e.g., on the touchscreen 216) that the user 108 may interact with to trigger transmission of a service request to the task server system 122. More specifically, a user interface 1202 is shown in FIG. 12A displayed on the requesting device 110, for example, using the requesting device I/O interfaces 210 and displayed on the touchscreen 216. Thus, in one embodiment, the user interface 1202 is generated and displayed by the requesting device processor 202, for example, as part of a task force application (not shown) using the task initiation manager 1002.

In FIG. 12A, the user interface 1202 lists different tasks that the user 108 may request, namely, a lawn care task 1204A, a paint task 1204B, and a clean task 1204C. Each listing provides a task identification (e.g., name), a feedback rating (i.e., star graphics) and a cost for the task. As mentioned above, each task may also be made up of sub-tasks. For example, the user interface 1202' in FIG. 12B illustrates a display of sub-tasks for the lawn care task 1204A, namely, a mow sub-task 1206A, a trim sub-task 1206B, and an edge sub-task 1206C. The sub-tasks may also be stored and defined in the task database 512. Additionally, each task and/or sub-task may be associated with a particular task robot 124, task tool 126, and/or a particular attachment 716 needed to complete the task and/or sub-task. For example, as shown in FIG. 12B, the mow sub-task 1206A is associated with an autonomous mower 1208A. The trim sub-task 1206B is associated with a trimming tool 1208B and the edge sub-task 1206C is associated with an edger tool 1208C. The associated robots, tools, and/or attachments may also be defined by the task database 512.

As mentioned above, tasks may have task attributes, which are properties or characteristics of the task. One or more of the task attributes may be selected by the user 108. For example, in FIG. 12C, the interface 1202" is an exemplary interface showing attribute selection by the user 108. Here, a graphic representation of the task area 102 and the structure 104 of FIG. 1 is displayed. A selection area 1212 is drawn by a hand 1210 of the user 108. The selection area 1212 is a sub-area of the task area 102, for example, a lawn area where a mow sub-task is to be performed. The user 108 may select the grass length (e.g., an attribute of the mow task) by selecting a value from the box 1214.

In other embodiments, the service request may originate from a different device than the requesting device 110 and/or may be automatically triggered and transmitted to the task server system 122. For example, one of the devices 116 may automatically transmit a service request to the task server system 122 based on a pre-defined criteria and/or threshold. As an illustrative example, data from a home security camera (e.g., video) may be used to detect a task trigger event that requires one or more tasks to be performed. Upon detection of the task trigger event, a service request is transmitted to the task and server system 122 including data about the task trigger event. For example, based on object detection applied to a video captured by the home security camera, a cleanup event (i.e., a task trigger event) may be detected when a glass of milk is spilled on a floor surface within the structure 104, for example, on a kitchen floor. Upon detection of the cleanup event, the hub device 116d may transmit a service request for a cleaning task to the task and server system 122. In other embodiments, a service request may be automatically transmitted to the task and server system 122 on a pre-defined reoccurring basis, for example, based on a schedule or a subscription. Thus, service requests and/or tasks may be initiated and/or executed on-demand or on a reoccurring (e.g., subscription) basis.

Referring again to FIG. 11, at block 1104, the method 1100 describes the operations of performing task evaluation, and at block 1106, the method 1100 describes the operations of determining task(s) to be performed. In one embodiment, the task processor 502 executes blocks 1104 and 1106 using, for example, the task evaluation manager 1004 and the task determination manager 1006. Blocks 1104 and 1106 will now be described with reference to FIG. 13, which illustrates an exemplary method 1300 for task evaluation and determination. At block 1302, the method 1300 includes controlling movement of the UAV 126a to the task area 102. In one embodiment, the task processor 502 executes block 1302 using, for example, the task evaluation manager 1004. In some embodiments, the task processor 502 may provide a destination address of the task area 102 to the UAV 126a. The UAV 126a may use the destination address for navigation and route finding via the robot location system 708. In some embodiments, movement of the UAV 126a is controlled from the base station pod 132 to the task area 102. Thus, in this embodiments, the UAV 126a may be a part of the base station pod 132. In other embodiments, movement of the UAV 126a is controlled from the distribution center 141 to the task area 102. The task server system 122 may deploy the UAV 126a from any location to the task area 102. Further, in an alternative embodiment where the task area is not yet defined, movement of the UAV 126a may be controlled to a user specified location (e.g., the structure 104) or any location specified by or associated with the user 108, the device 110, and/or the devices 116.

At block 1304, the method 1300 includes acquiring evaluation data about the task area 102. The evaluation data describes an initial state of the task area 102. For example, as mentioned above, the UAV 126a using sensors 714 may collect evaluation data about the task area 102. The UAV 126a may transmit the evaluation data to the task server system 122 via the network(s) 118. The evaluation data about the task area 102 acquired by the UAV 126a may include, but is not limited to, image data, video data, surveying data, mapping data, terrain modeling, collected physical material and specimens (e.g., soil, paint chips), weather data, and other conditions that may influence the task area 102 and/or the tasks to be performed. In some embodiments, in addition to the evaluation data, the task server system 122 may also access and/or receive evaluation data from the devices 116 and/or external data 134.

As mentioned above, in alternative embodiments where the task area is not yet defined, the UAV 126a using sensors 714 may collect evaluation data about the user specified location (e.g., the structure 104) or the location specified by or associated with the user 108, the user device 110, and/or the devices 116. In this embodiment, the task server system 122 may use the evaluation data to dynamically determine the task area 102. Thus, the task server system 122 may define the physical area where the task(s) are to be completed based on the evaluation data.

Referring again to block 1306, the method 1300 includes determining a task to be performed based on the service request, the task area 102, and the evaluation data. In one embodiment, the task processor 502 executes block 1306 using, for example, the task determination manager 1006. As mentioned above, the task server system 122 may also use data from the devices 116 and/or external data 134 to determine one or more tasks to be performed. In some embodiments, the task server system 122 utilizes (e.g., queries) the task database 512 to determine the task(s) to be performed. Sub-tasks and task attributes may also be determined at block 1306. In some embodiments, the task server system 122 generates and/or updates the task list 520 based on the task(s) to be performed and the sub-tasks and/or task attributes.

In addition to task determination, at block 1308, the task processor 502 may also determine the equipment needed to perform the tasks. The equipment may include types of task robots 124 and/or task tools 128 (e.g., autonomous machines) needed to perform the tasks. The criteria used to determine the selection may include autonomous robot capabilities, attachments, availability, and location of the autonomous robot. In some embodiments, the task processor 502 may query the task database 512 and/or the autonomous machine database 514 to determine which types of autonomous machines are needed to perform the task. As an illustrative example, a mow task may require an autonomous mower, a trim attachment tool, and an edger tool. In some embodiments, the task list 520 can be updated with the equipment needed to perform the tasks.

Referring back to FIG. 11, in some embodiments, at block 1108, the method 1100 includes determining a cost for the task(s) to be performed. In some embodiments, the task server system 122 executes block 1108 using, for example, the negotiation and settlement manager 1014. Thus, the task processor 502 calculates a cost for the task to be performed based at least in part on the task. The cost may be based on various factors including, but not limited to, location, time (e.g., off-peak pricing), type of autonomous machines required for the task, and demand for autonomous machines required for the task. In one embodiment, the cost is based on the amount of evaluation data the user 108, the requesting device 110, and/or the devices 110 may provide to supplement or replace the evaluation data acquired by the UAV 126a (e.g., at block 1304). Thus, the costs may be offset if the user 108 provides evaluation data so that a UAV 126a is not required to acquire the evaluation data. Additionally, the cost may be based on group pricing. For example, as will be discussed with FIGS. 22 and 23, if more than one user in a predetermine area requests the same or similar service, a group discount may be factored into the cost. The cost may be based in any type of currency or reward, for example, monetary currency (e.g., dollar, euro), bitcoin, crypto currency, stocks, bonds, discounts, coupons, and other types of rewards. In some embodiments, block 1108 may occur with block 1114 if FIG. 11, which will be discussed in further detail herein.

B. Task Execution

Referring again to FIG. 11, at block 1110, the method 1100 includes selecting a set of autonomous machines to fulfill the service request, including the task determined at block 1106. The set of autonomous machines may be based in part on the determination made at block 1308 of FIG. 13, namely, determining equipment needed to perform the tasks. For example, at block 1308, the task processor 502 may determine an autonomous mower, a trimming tool, an edger tool are required to fulfill the lawn care task. At block 1110 of FIG. 11, the task processor 502 identifies the specific autonomous mower, trimming tool, and edger tool that are available to fulfill the lawn care task. In some embodiments, a single task robot of the task robots 124 has multiple capabilities and/or can utilize multiple task tools 128. Thus, the task processor 502 may identify one or more task robots to complete the lawn care task.

Figure 14:
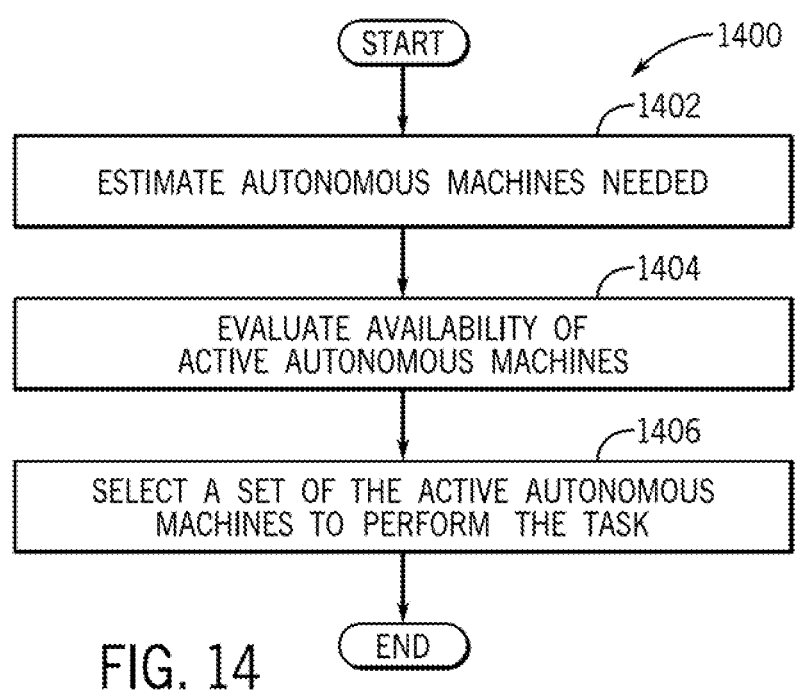
FIG. 14 is a process flow diagram of a method for selecting autonomous machines to perform the task according to an exemplary embodiment.
Figure 15:
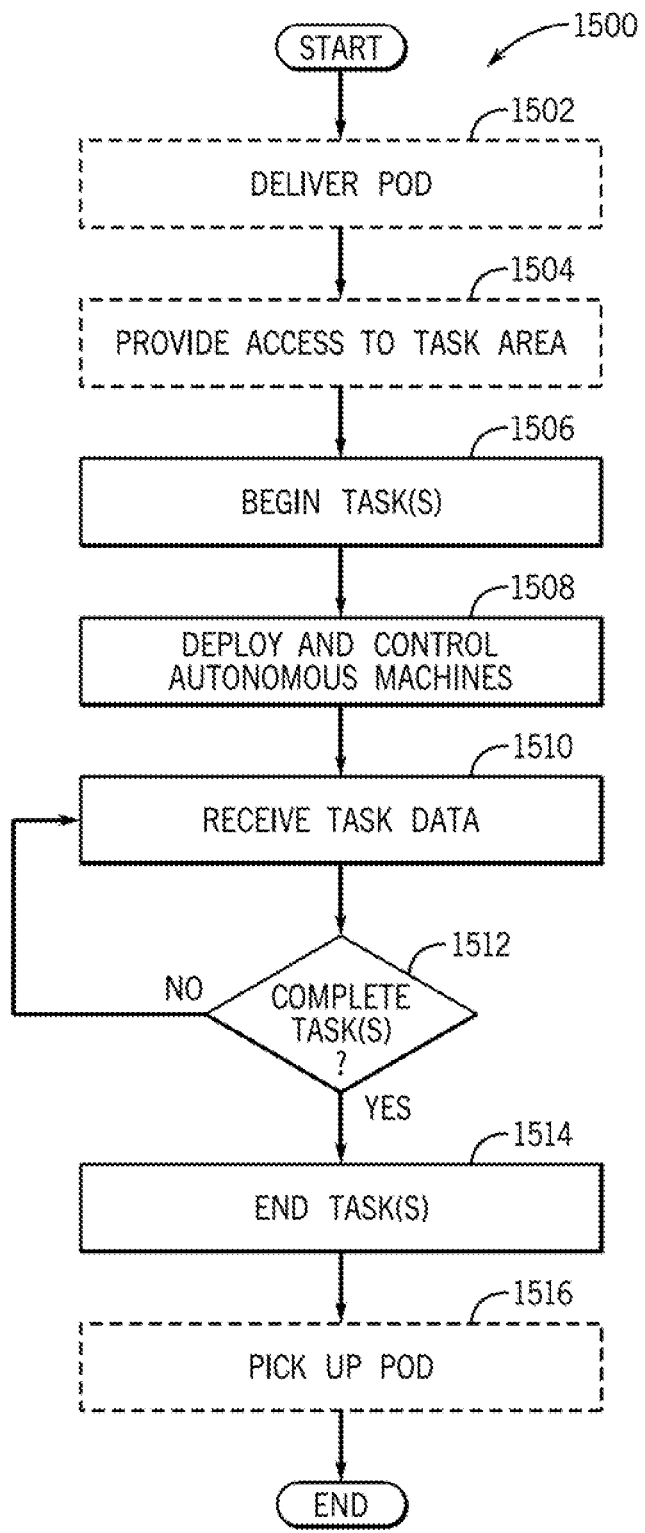
FIG. 15 is a process flow diagram of a method for executing tasks according to an exemplary embodiment.
Figure 16:
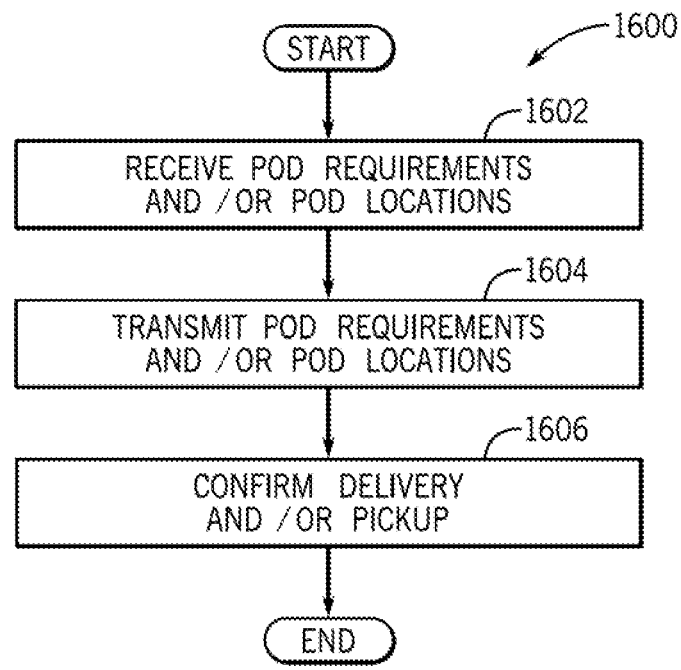
FIG. 16 is a process flow diagram of a method for pod delivery and/or pickup according to an exemplary embodiment.
Figure 17:
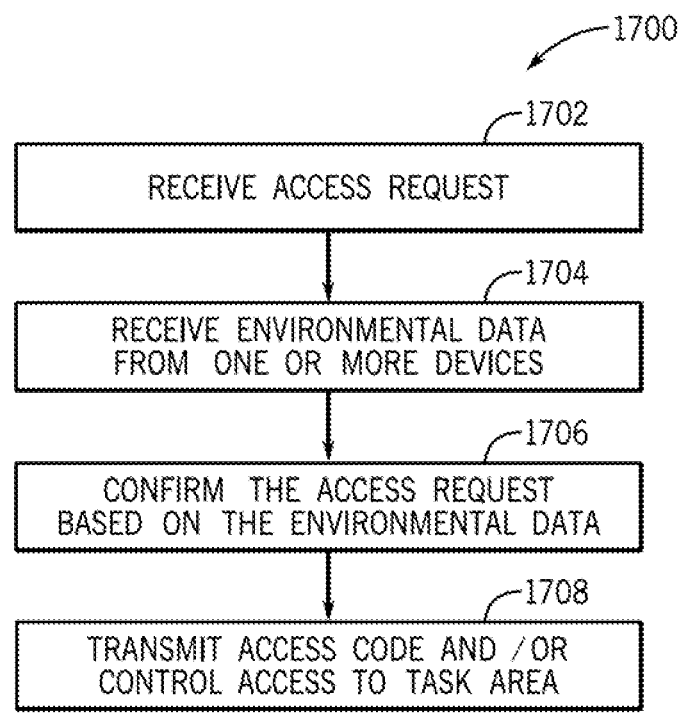
FIG. 17 is a process flow diagram of a method for providing access according to an exemplary embodiment.
Figure 18:
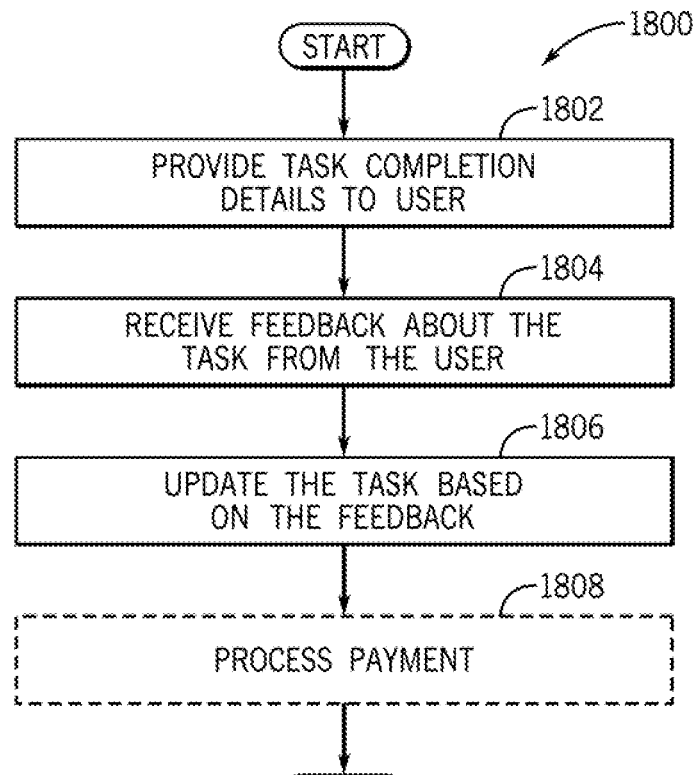
FIG. 18 is a process flow diagram of a method for task settlement according to an exemplary embodiment.

Block 1110 will now be described with references to FIG. 14, which illustrates a method 1400 for selecting the set of autonomous machines. In one embodiment, the task processor 502 utilizes the task execution and scheduling manager 1010 to execute the method 1400. At block 1402, the method 1400 includes estimating the autonomous machines (e.g., the task robots 124, the task tools 128) needed for the task. The estimation can include a number of autonomous machines and/or the types of autonomous machines. The task processor 502 may estimate the autonomous machines based on the time the task is to be performed, the time length of the task, a location of the task area 102, and task attributes. For example, to fulfill a lawn care task, the task processor 502 may estimate two (2) autonomous mowers are needed for a 20 minute time period.

At block 1404, the method 1400 includes evaluating the availability of active autonomous machines. The task processor 502 may evaluate the availability of active autonomous machines based on the time the task is to be performed, the time length of the task, a location of the task area 102, and/or task attributes. In the embodiments described herein, active autonomous machines are those machines engaging or ready to be engaged in a task. In contrast, inactive autonomous machines are those not capable of engaging in a task, for example, autonomous machines that require repair or are undergoing maintenance. Inactive autonomous machines may also include essential autonomous machines that are engaging in a task and deemed essential to the task. Thus, in one embodiment, the task server and system 122 evaluates active autonomous machines in an area proximate to the task area 102 to determine which active autonomous machines are available for fulfilling the task given the various task attributes.

At block 1406, the method 1400 includes selecting the set of autonomous machines to perform the task. In some embodiments, the task processor 502 may select one or more autonomous machines (e.g., task robots 124, task tools 128) to perform he task based on at least the task and a location of the task area 102. The task server and system 122 may determine which autonomous machines of the available autonomous machines are capable of fulfilling the task. In some embodiments, which will be described in more detail with FIG. 15, the selected set of autonomous machines may be included within a pod (e.g., the base station pod 132) and delivered to the task area 102.

Referring again to FIG. 11, at block 1112, the method 1100 includes executing the task(s). For example, controlling the selected one or more autonomous machines to perform the task. Block 1112 will now be described with reference to FIG. 15, which illustrates a method 1500 for task execution. In one embodiment, the task processor 502 utilizes the task execution and scheduling manager 1010 to execute the method 1500. At block 1502, the method 1500 may include delivering a pod, for example, the base station pod 132. Block 1502 will now be described with reference to FIG. 16, which illustrates a method 1600 for pod delivery and/or pod pickup, and which may be executed by the pod manager 1008.

At block 1602, the method 1600 includes receiving the base station pod 132 requirements and/or the base station pod 132 location. For example, for pod delivery, the pod requirements may include an identification of the autonomous machines selected at block 1406 of FIG. 14. In this embodiment, the pod requirements may be transmitted to the distribution center 136 where a delivery worker 140 loads the base station pod 132 with the autonomous machines selected at block 1406. Here, the autonomous machines may be stored at the distribution center 136. In some embodiments, the pod requirements may also include a current location of the autonomous machines selected at block 1406. In this embodiment, the autonomous machines may be at various locations (e.g., the distribution center 136, base station pods in different locations) and may need to be picked from the various locations to load into the base station pod 132 for delivery. Furthermore, for pod delivery, the pod location may include a destination address (e.g., where the pod is to be delivered). In contrast, for pod pick-up, the pod location may include a pick-up address (e.g., where the pod is to be picked up).

At block 1604, the method 1600 includes transmitting the pod location and/or the pod requirements to the base station pod 132. Thus, the destination address and/or the pick-up address is transmitted to the base station pod 132 and the base station pod 132 navigates to the destination address and/or the pick-up address using, for example, the pod location system 608. At block 1608, the method 1600 includes confirming delivery and/or pickup verification. In one embodiment, image confirmation and/or verification is utilized at block 1608. For example, images data may be captured by the requesting device sensors 214, base station pod sensors 614, and/or robot sensors 714 of the base station pod 132 and/or an environment surrounding the base station pod 132. An identification encoded within the base station pod 132 and/or an identification externally visible on the base station pod 132 may be compared to the pod requirements and/or pod location to confirm and/or verify the pod delivery and/or pickup.

Referring again to FIG. 15, at block 1504, the method 1500 may include providing access to the task area 102. Block 1504 will now be described with references to FIG. 17, which illustrates a method 1700 for providing task area access. At block 1702, the method 1700 includes receiving an access request to the task area 102. The access request may include an identification of a locked entryway (not shown), for example, a gate enclosing the task area 102 or a front door of the structure 104. In some embodiments, the access request originates from an autonomous machine (e.g., the task robot 124 and/or the task tool 126). For example, the task robot 124 may transmit an access request including an identification of a locked entryway to the task and server system 122, using the robot interface 712, the task interface 508, and the network(s) 118. In other embodiments, the task robot and/or the task server system 122 may transmit an access request to a home security system of the structure 104, for example, one of the devices 116.

At block 1704, the method 1700 includes receiving environmental data about the task area 102 and/or the locked entryway. For example, the task server and system 122 and/or one of the devices 116 may receive images of the task area 102 or an immediate area surrounding the locked entryway.

At block 1706, the method 1700 includes confirming the access request based on the environmental data. In one embodiment, the task server system 122 and/or one of the devices 116 may determine whether the autonomous machine requesting access has permission to access the locked entryway based on, for example, the service request and/or task being completed. Additionally, the task server system 122 and/or one of the devices 116 may confirm the identity of the autonomous machine request access based on the environmental data about the task area 102. In some embodiments, the autonomous machine may be encoded with an identification and/or have an identification externally visible. The images obtained at block 1704 may be analyzed to confirm the identity of the autonomous machine.

At block 1708, the method 1700 includes transmitting an access code and/or controlling access to the task area 102. Thus, in one embodiment, the task server system 122 and/or the devices 116 may automatically control access (e.g., open the locked entryway) and/or transmit an access code to the autonomous machine. In one embodiment, providing the one or more autonomous machines access to the task area 102 includes transmitting a access code from a home automation system (e.g., one of the devices 116) to the one or more autonomous machines. In another embodiment, an access code stored at the vehicle 106 may be transmitted to the autonomous machine. Alternatively, the vehicle 106 may provide controlled access by opening a garage door (not shown). In some embodiments where the task involves the vehicle 106 (e.g., cleaning the vehicle 106), the vehicle 106 may provide controlled access to one or more doors (not shown) of the vehicle 106. In some embodiments, access may be further monitored by video surveillance of which autonomous machine enter the secured area.

Referring back to FIG. 15, at block 1506, the method 1500 includes beginning the task(s). In some embodiments, more than one task may be executed in parallel or sequentially. Thus, blocks 1506, 1508, 1510 may be iteratively repeated depending on the number of tasks to be executed. In particular, the blocks 1506, 1508, and 1510 may be applied to each task in the task list 520. Accordingly, at block 1508, the method 1500 includes deploying and/or controlling the selected set of autonomous machines based on the task list 520. In one embodiment, the task processor 502 executes blocks 1508 and 1510 using, for example, the task execution and scheduling manager 1010.

At block 1510, the method 1500 includes receiving environmental data about the task area 102. In one embodiment, block 1510 is similar to blocks 1302 and 1304 of FIG. 13. The UAV 126a may be controlled to acquire evaluation data about the task area 102 to determine the status of the tasks (e.g., task complete, quality of task performance). In other embodiments, the environmental data is received from the devices 116 and/or the autonomous machines performing the tasks. In further embodiments, the evaluation data is acquired from a home automation system (e.g., one of the devices 116) and/or the third party server system 120. At block 1512, the method 1500 includes determining whether the task(s) are complete. Thus, using the environment data and/or evaluation data acquired at block 1510, it is determined whether the tasks have been completed or are still in progress. In particular, the UAV 126a can acquire final evaluation data and compare the final evaluation data to the evaluation data acquired during task evaluation (e.g., the block 1104 of FIG. 11). For example, a measurement of grass length made during task evaluation can be compared to a measurement of grass length made after the tasks are completed. Thus, measurements of the task area 102 are analyzed to determine if they match a final state. In some embodiments, a tolerance level is applied to the measurements for quality assurance purposes.

If the tasks have been completed, at block 1514, the method 1500 includes ending the task(s). In some embodiments, the task server system 122 provides an alert or a notification to the user 108 about the completed tasks as will be described with FIG. 18. Additionally, in some embodiments, at block 1516, the method 1500 includes picking up the pod, which has been described above with block 1502. In some embodiments, the base station pod may reside in a particular location permanently or on a temporary basis.

C. Task Settlement and Feedback

Referring again to FIG. 11, at block 1114, the method 1100 includes performing transaction settlement. Block 1114 will now be described with reference to FIG. 18 and method 1800. In one embodiment, the task processor 502 executes method 1800 using, for example, the negotiation and settlement manager 1014 and/or the task feedback manager 1016. At block 1802, the method 1800 includes providing completion details to the user 108. For example, the task server system 122 may provide a notification or an alert to the requesting device 110 and/or the devices 116 to notify the user 108 that the task has been completed. In one embodiment, the task server system 122 provides a feedback interface to the requesting device 110 allowing the user 108 to provide feedback input to the requesting device 110. For example, a rating interface (e.g., star graphics shown in FIG. 12A) may be provided to the user 108 allowing the user to rate the service of the particular task. At block 1804, the method 1800 includes receiving feedback about the task from the user 108. For example, input provided to the requesting device 110 may be received by the task server system 122.

At block 1806, the method 1800 includes updating the task based on the feedback. Thus, the task server databases 506 may be updated to improve future tasks. In some embodiments, machine learning and deep learning techniques, namely, neural networks, are utilized to update the task server database 506. Furthermore, at block 1808, the method 1800 may include processing the payment. For example, transaction settlement using the cost determined at block 1108 of FIG. 11 may be finalized between the requesting device 110 and the task server system 122.

D. Maintenance and Charging

Figure 19:
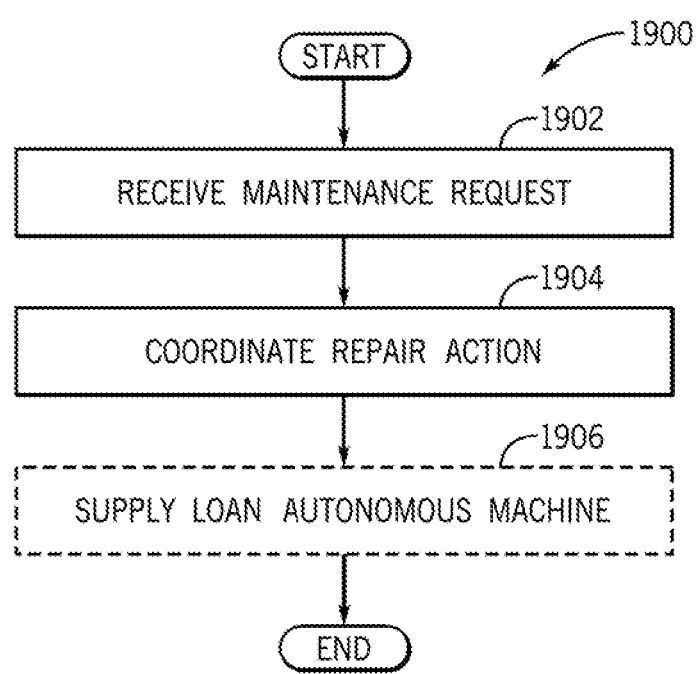
FIG. 19 is a process flow diagram of a method for autonomous machine maintenance according to an exemplary embodiment.

For effective workforce management, maintenance of the autonomous machines must be performed on a regular basis and on an on-demand basis. Referring now to FIG. 19, a method 1900 describes an exemplary maintenance method according to an exemplary embodiment. In one embodiment, the task processor 502 executes the method 1900 using, for example, the maintenance manager 1018. At block 1902, the method 1900 includes receiving a maintenance request. The maintenance request may originate from the task robots 124, the task tools 126, and/or the base station pod 132, and transmitted to the task server system 122. In other embodiments, the task server system 122 may initiate the maintenance request based on a reoccurring maintenance schedule as defined in the autonomous machine database 514. The maintenance request may include an identification of the autonomous machine, diagnostic codes, or any other information about the state of the autonomous machine.

At block 1904, the method 1900 includes coordinating repair action. Thus, in one embodiment, the task server system 122 controls pickup and/or delivery of the autonomous machines as described above with FIG. 16. For example, the task server system 122 may control the base station pod 132 and/or a delivery vehicle (not shown) to pick up a task robot at the task area 102 and/or the base station pod 132 and transport the task robot to the distribution center for maintenance. Further, upon completion of the maintenance, the base station pod 132 and/or a delivery vehicle (not shown) may transport the task robot back to the task area 102 and/or the base station pod 132. In some embodiments, a replacement autonomous machine may be provided. For example, at block 1906, the method 1900 includes supplying a loan autonomous machine. Thus, in parallel with picking up the task robot, a replacement autonomous machine may be delivered and/or a replacement autonomous machine (e.g., from a nearby pod) may be controlled to navigate to the base station pod 132.

Figure 20:
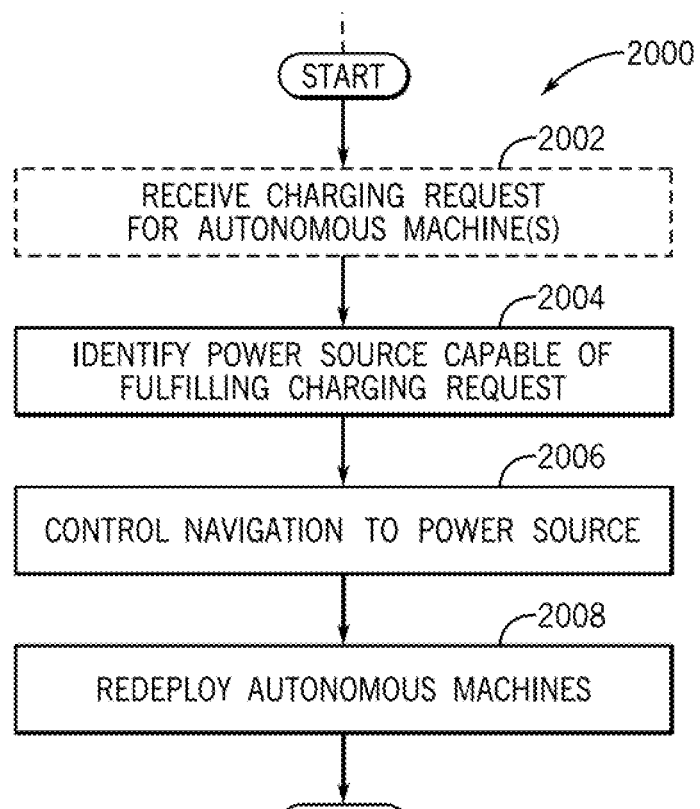
FIG. 20 is a process flow diagram of a method for autonomous machine charging according to an exemplary embodiment.

In addition to maintenance, the task robots 124, the task tools 128, and/or the base station pod 132 may require charging. As mentioned above, the base station pod 132 also includes the power source 616 which may be used to power or charge one or more of the task robots 124 and/or the task tools 128. In some embodiments, the power source 616 may be used to power or charge the base station pod 132 itself (e.g., solar panels). In other embodiments, mobile battery charging may be implemented to charge, the task robots 124, the task tools 128, and/or the base station pod 132. Referring now to FIG. 20, a method 2000 for exemplary method for autonomous machine charging will now be described. At block 2002, the method 2000 includes receiving a charging request for autonomous machine(s). In one embodiment, the task robots 124 and/or the task tools 126 transmit a charging request to the base station pod 132 and/or the task server system 122. For example, the robot processor 702 may transmit a charging request upon reaching a predetermined energy threshold. For example, a charging request may be transmitted when the task robot 124 reaches 10% battery level. In some embodiments, the charging request is based upon the predetermine energy threshold and a task to be performed. For example, if the task robot 124 is currently engaged in a task, the charging request may be transmitted based on the battery level of the task robot 124 and the remaining amount of time to complete the task. The charging request may include other parameters such as, a location of the task robot 124, a battery type, a remaining battery capacity, a charging voltage, a location of the base station pod 132, among others. At block 2004, the method 2000 includes identifying a power source capable of fulfilling the charging request. In one embodiment, the base station pod 132 provides charging to the task robot 124. In some embodiments, it is determined whether the power source 616 is capable of charging the task robot 124. In other embodiments, mobile battery charging may be implemented.

At block 2006, the method 2000 includes controlling navigation to power source. For example, the task processor 502 and/or the robot processor 702 may provide a charging address to the task robot 124 and/or the base station pod 132. The robot processor 702 using the robot location system 708 may control navigation of the task robot 124 to the identified power source. Thus, the task robot 124 may be controlled to navigate back to the base station pod 132 for charging. In another embodiment, a mobile battery charging unit may be controlled to navigate to the task robot 124 and/or the base station pod 132. For example, a vehicle (not shown) may be identified as a mobile battery charging unit and controlled to navigate to the task robot 124 and/or the base station pod 132 for charging. Upon completion of charging (e.g., the task robot 124 reaches a predetermined energy threshold), at block 2008, the method 2000 includes redeploying the autonomous machines. For example, the task robot 124 may be controlled to resume a task at the task area 102. In some embodiments, a replacement autonomous machine may be provided as described above with FIG. 19, block 1906.

E. Monitoring and Task Suggestion

Figure 21:
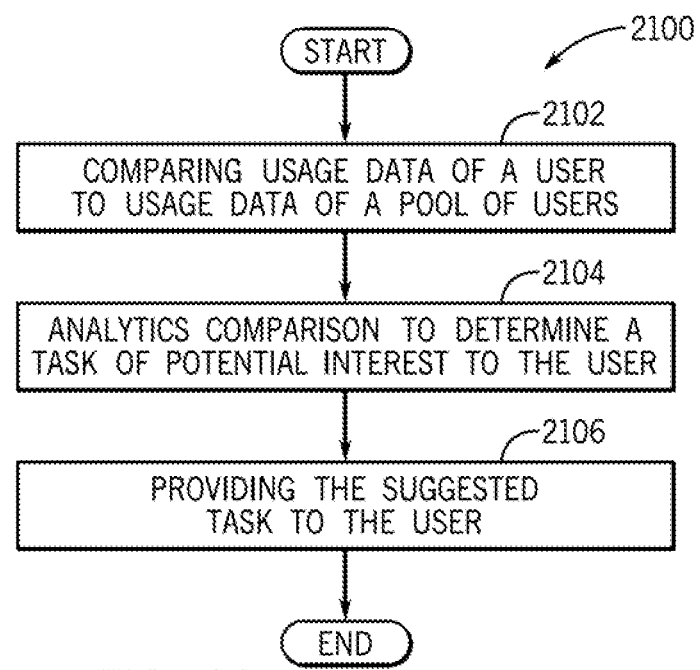
FIG. 21 is a process flow diagram of a method for task suggestion based on usage comparisons according to an exemplary embodiment.

In some embodiments, the task server system 122 may predict and/or suggest tasks for the task area 102 and/or the user 108. Referring now to FIG. 21, a method 2100 for task suggestion based on social comparison is shown according to an exemplary embodiment. At block 2102, the method 2100 includes comparing usage data of the user 108 to usage data of a pool of users. For example, usage data about the task area 102 and/or the structure 104 may be stored at the usage database 516. Usage data for a plurality of users may be stored at the usage database 516. The task processor 502 using, for example, the usage and monitoring manager 1022, may query the usage database 516 for usage data of a pool of users similarly situated to the user 108. For example, users with task areas and/or structures in a similar area, of a similar size, etc. The usage data may quantify utility usage (e.g., energy, water, gas, phone, internet), use of the task robots 124, use of the devices 116, service requests, among others. As an illustrative example, the task processor 502 may compare water usage of the user 108 (e.g., associated with the task area 102 and/or the structure 104) with water usage of users having a similarly sized task area, structure, and in a similar area as the user 108.

At block 2104, the method 2100 includes analyzing the comparison to determine a task of potential interest to the user 108. Based on the comparison, the task processor 502 may determine one or more tasks (e.g., service requests) of potential interest to the user 108. For example, the tasks may improve utility efficiency for the user 108 in comparison to the pool of users. As an illustrative example, the task processor 502 may suggest less frequent mowing and/or a longer grass blade length so that less watering is required for the lawn thereby lowering water usage. In some embodiments, the task processor 502 may consider regional laws and/or guidelines from a municipality (e.g., the third party server system 120) when determining a task of potential interest to encourage less consumption of utilities. At block 2106, the method 2100 includes providing the task of potential interest to the user 108. For example, the task processor 502 may present the task of potential interest to the user 108 using the requesting device 110. In other embodiments, the task processor 502 may simply present the comparison data from blocks 2102 and 2104. In some embodiments, game-style rankings may be presented to the user 108 to indicate how the user 108 is doing in their neighborhood against the pool of users. This social comparison and/or task suggestion may increase awareness and create behavioral change with the user 108.

IV. Region Management

Figure 22:
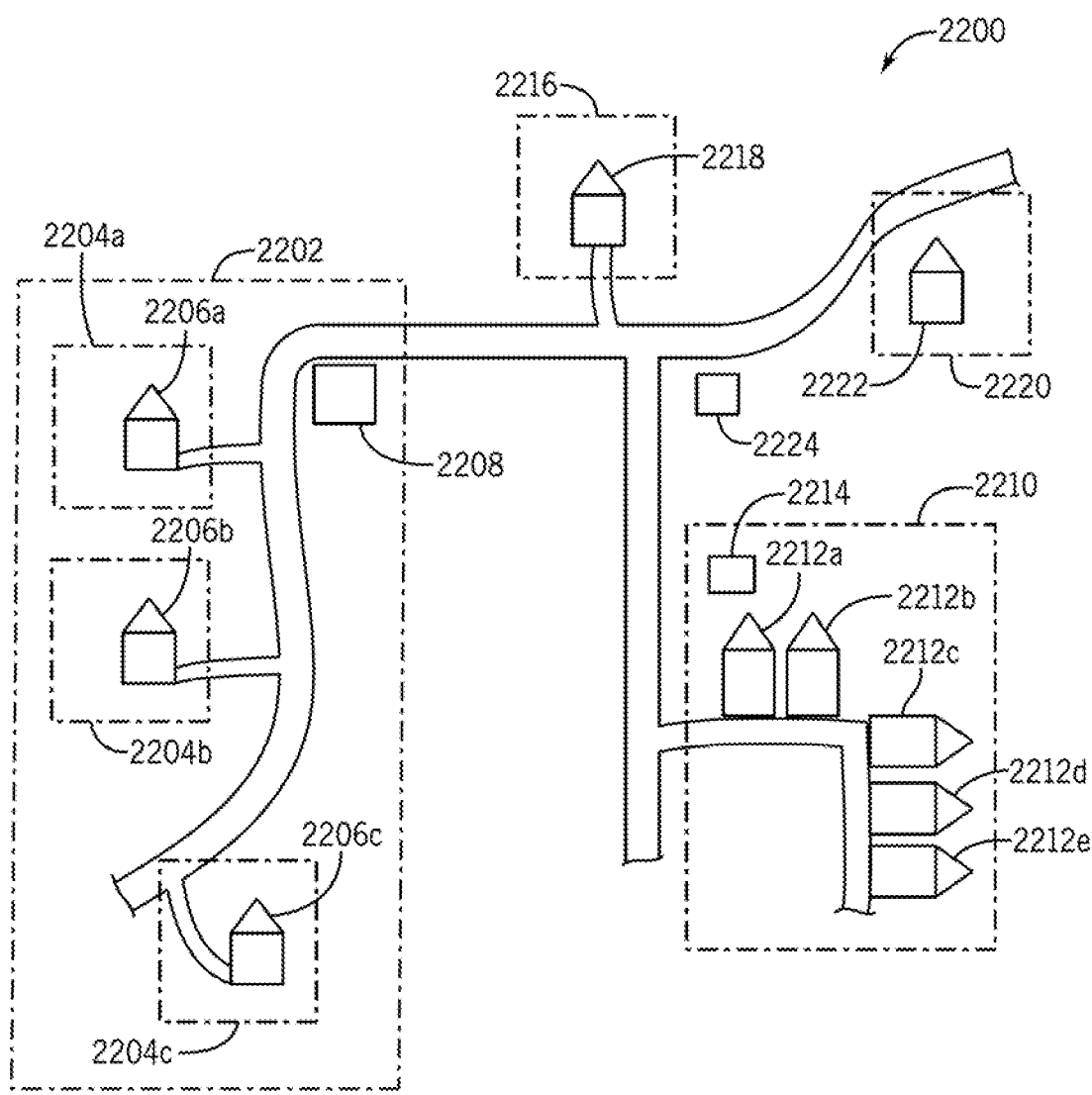
FIG. 22 is a schematic diagram of more than one task area within a region according to an exemplary embodiment.

FIGS. 1-21 describe an autonomous mobile workforce as applied to one user and task area. However, the systems and methods described herein may also be applied to more than one user and/or more than one task area. In particular, the systems and methods described herein may be applied at a regional level. A "region" as used herein may be a neighborhood, a city, a municipality, a street, a state, a county, a country, a home owner's association or any other level of granularity. In some embodiments discussed herein, a region and/or a task area may be referred to as a zone network. Referring now to FIG. 22, a schematic diagram of more than one task area within a region 2200 is shown according to an exemplary embodiment. Here, the region 2200 is a municipality and includes more than one task area. Specifically, a task area 2202, which includes a sub-task area 2204*a*, a sub-task area 2204*b*, and a sub-task area 2204*c*. The sub-task area 2204*a* includes a structure 2206*a*, the sub-task area 2204*b* includes a structure 2206*b*, and the sub-task area 2204*c* includes a structure 2206*c*. In this embodiment, the task area 2202 is defined by a home owner's association (HOA). A base station pod 2208 is located within the task area 2202 and services the task area 2202, the sub-task area 2204*a*, the sub-task area 2204*b*, and the sub-task area 2204*c*.

The region 2200 also includes a task area 2210, which includes a structure 2212*a*, a structure 2212*b*, a structure 2212*c*, a structure 2212*d*, and a structure 2212*e*. The task area 2210 may be defined as a townhome complex. A base station pod 2214 is located within the task area 2210 and services the task area 2210. The region 220 also includes a task area 2216 with a structure 2218 and a task area 2220 with a structure 2222. A base station pod 2224 located in proximity to the task area 2216 and the task area 2220 services the task area 2216 and the task area 2220. Although not shown in FIG. 22, each of the task areas and/or structures may be associated with one or more users. Any of the components shown in FIGS. 1-21 may be implemented with FIGS. 22 and 23.

Figure 23:
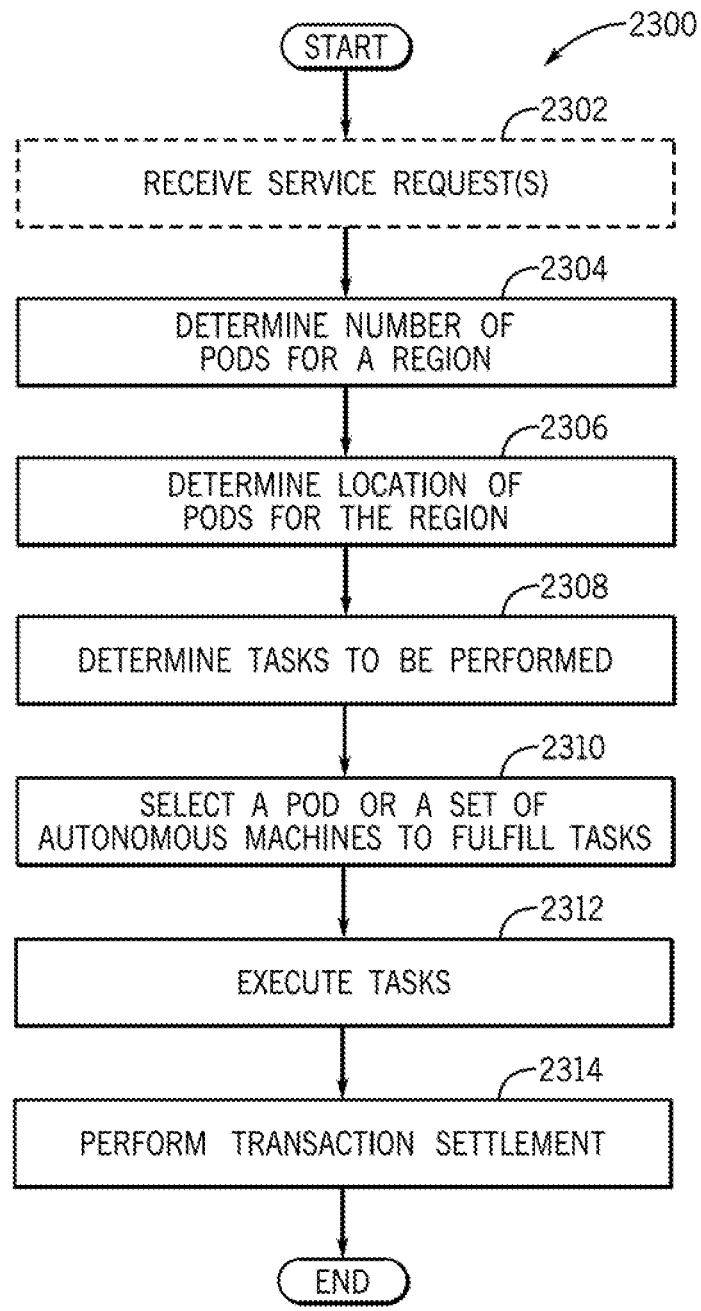
FIG. 23 is a process flow diagram of a method of autonomous mobile workforce for the region of FIG. 22 according to an exemplary embodiment.

Referring now to FIG. 23, a method 2300 for autonomous mobile workforce within the region 2200 is shown. At block 2302, the method 2300 includes receiving service request(s). In one embodiment, the service requests originate from each structure within the task area 2202, the task area 2210, the task area 2216, and the task area 2220. For example, as described in detail with block 1102 of FIG. 11, the service requests may originate from one or more devices (e.g., the devices 116) that are associated with each task area, sub-task area, and/or structure.

At block 2304, the method 2300 includes determining a number of pods for the region 2200. Thus, in one embodiment, the task processor 502 may determine a number of pods for the region 2200 based on at least one of the following: the number of service requests, the type of service requests, the number and size of the task areas, the number of structures, among others. At block 2306, the method 2300 includes determining a location of the pods for the region 2200. The task processor 502 may also determine the most effective location for each pod in the region 2200. As shown in FIG. 22, the base station pod 2208 is located within the task area 2202 and services the sub-task area 2204*a*, the sub-task area 2204*b*, the sub-task area 2204*c*. The base station pod 2214 is located within the task area 2210 and services the task area 2210. The base station pod 2224 is located in proximity to the task area 2216 and the task area 2220 and services the task area 2216 and the task area 2220.

At block 2308, the method 2300 includes determining tasks to be performed, which is described in detail with blocks 1104 and 1106 of FIG. 11. Referring again to FIG. 23, at block 2310, the method 2300 includes selecting a pod or a set of pods to fulfill the tasks. In another embodiment, at block 2310, the method 2300 includes selecting one or more task robots 124 and/or one or more task tools 128, which may be located in any one of the base station pods shown in FIG. 22. Thus, in some embodiments, base station pods may share autonomous machines and/or more than one base station pod may work together to service a particular task area or tasks. In some embodiments, block 2310 may include selecting a set of autonomous machines that fulfill the service requests as discussed above with block 1110 of FIG. 11. Referring again to FIG. 23, at block 2312, the method 2300 includes executing the tasks as described above with block 1112 of FIG. 11. Further, at block 2314, the method 2300 includes performing transaction settlement, which may include block 1114 of FIG. 11.

The embodiments discussed herein may also be described and implemented in the context of "computer-readable medium" or "computer storage medium." As used herein, "computer-readable medium" or "computer storage medium" refers to a non-transitory medium that stores instructions, algorithms, and/or data configured to perform one or more of the disclosed functions when executed. Computer-readable medium may be non-volatile, volatile, removable, and non-removable, media implemented in any method or technology for storage of information such as computer readable instructions, data structures, modules or other data. Computer-readable medium may include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device may interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for workforce management, comprising:
receiving at least one service request associated with a region from one or more requesting devices, the region including a plurality of task areas, each of the plurality of task areas including at least one home, at least one of the plurality of task areas including a plurality of sub-task areas and a plurality of homes with each of the plurality of homes being included in a respective one of the plurality of sub-task areas, the region also including a plurality of base station pods, each of the base station pods housing an unmanned aerial machine and one or more autonomous machines;
controlling movement of the unmanned aerial machine from at least one of the base station pods to each of the plurality of task areas from which at least one service request is received, the unmanned aerial machine acquiring evaluation data about the plurality of task areas from which at least one service request is received;
determining a number of tasks to be performed in each of the plurality of task areas from which at least one service request is received based on the at least one service request, the task area, and the evaluation data; and
for each of the plurality of task areas from which at least one service request is received:
selecting one or more autonomous machines and one or more task tools from one or more base station pods to perform the number of tasks based on at least the number of tasks to be performed and a task area location of relative to a location of the base station pods;
controlling the selected one or more autonomous machines and task tools from the one or more base station pods to perform each of the number of tasks; and
electronically analyzing final evaluation data that is associated with a current state of the task area with the evaluation data to determine if each task of the number of tasks has been completed and controlling one or more of the task tools to switch to another task of the number of tasks after completion of the task.

2. The method of claim 1, further comprising:
receiving an access request from the one or more autonomous machines with identification of a locked entryway that provides access to the home; and
upon confirming an identify of the one or more autonomous machines, providing the one or more autonomous machines with access to the home via the locked entryway, wherein providing the one or more autonomous machines with access to the home further includes transmitting an access code from a home automation system to the one or more autonomous machines.

3. The method of claim 1, wherein the task includes one or more sub-tasks requiring one or more tools to complete the task.

4. The method of claim 1, wherein, for at least one of the plurality of task areas, one or more autonomous machines and one or more task tools is selected from more than one of the base station pods to perform the number of tasks based on at least the number of tasks to be performed and the task area location of relative to a location of the base station pods.

5. The method of claim 1, further comprising:
responsive to receiving the at least one service request, determining a number and location of base station pods for the region, and controlling the determined number of base station pods to travel to the determined location in the region.

6. The method of claim 5, wherein, for at least one of the plurality of task areas, one or more autonomous machines and one or more task tools is selected from more than one of the base station pods to perform the number of tasks based on at least the number of tasks to be performed and the task area location of relative to a location of the base station pods.

7. A networked workforce computing system, comprising:
one or more requesting devices;
base station pods housing autonomous machines, the base station pods being provided in a region;
a task management server; and
a processor operatively connected for computer communication to the one or more requesting devices, the autonomous machines, and the task management server over a network, wherein the processor:
receives at least one service request associated with the region from the one or more requesting devices, wherein the region includes a plurality of task areas, each of the plurality of task areas including at least one home, at least one of the plurality of task areas including plurality of sub-task and a plurality of homes with each of the plurality of homes being included in a respective one of the plurality of sub-task areas;
determines a number of tasks to be performed in each of the plurality of task areas from which at least one service request is received based on the at least one service request and evaluation data, wherein the evaluation data is about each of the plurality of task areas and is received over the network; and
for each of the plurality of task areas from which at least one service request is received:
selects a number of autonomous machines and one or more task tools from one or more of the base station pods to fulfill the number of tasks based on at least the number of tasks to be performed and a task area location relative to a location of the base station pods;
controls the selected number of autonomous machines and task tools from the one or more of the base station pods to perform each of the number of tasks; and
electronically analyzes final evaluation data that is associated with a current state of the task area with the evaluation data to determine if each task of the number of tasks has been completed and controls one or more of the task tools to switch to another task of the number of tasks after completion of the task.

8. The networked workforce computing system of claim 7, further including an unmanned aerial machine housed in each base station pod, wherein the processor controls the unmanned aerial machine to acquire the evaluation data.

9. The networked workforce computing system of claim 7, wherein the one or more requesting devices include a plurality of requesting devices, and wherein each requesting device of the plurality of requesting devices are part of a predefined group and each base station pod is located in proximity to each of the requesting devices.

10. The networked workforce computing system of claim 9, wherein the processor generates a task list based on the at least one service request, the tasks, the sub-task areas and the autonomous machines to maximize performance of the tasks by the autonomous machines.

11. The networked workforce computing system of claim 10, wherein the processor transmits one or more commands to selected autonomous machines to cause the selected autonomous machines to travel to the sub-task areas and execute each task associated with each task area according to the task list.

12. The networked workforce computing system of claim 7, wherein, for at least one of the plurality of task areas, the processor selects one or more autonomous machines and one or more task tools from more than one of the base station pods to perform the number of tasks based on at least the number of tasks to be performed and the task area location of relative to a location of the base station pods.

13. A non-transitory computer-readable storage medium including instructions that, when executed by a processor, cause the processor to:
receive at least one service request associated with a region from one or more requesting devices, the region including a plurality of task areas, each of the plurality of task areas including at least one home, at least one of the plurality of task areas including a plurality of sub-task areas and a plurality of homes with each of the plurality of homes being included in a respective one of the plurality of sub-task areas, the region also including a plurality of base station pods, each of the base station pods housing an unmanned aerial machine and one or more autonomous machines;
transmit a command to the unmanned aerial machine from at least one of the base station pods to drive the unmanned aerial machine to each of the plurality of task areas from which at least one service request is received, the unmanned aerial machine acquires evaluation data about the plurality of task areas from which at least one service request is received;
determine a number of tasks to be performed in each of the plurality of task areas from which at least one service request is received based on the at least one service request, the task area, and the evaluation data; and
for each of the plurality of task areas from which at least one service request is received:
select one or more autonomous machines and one or more task tools from one or more base station pods to perform the number of tasks based on at least the number of tasks to be performed and a task area location relative to a location of the base station pods;
controlling the selected one or more autonomous machines and task tools from the one or more base station pods to perform each of the number of tasks; and
electronically analyzing final evaluation data that is associated with a current state of the task area with the evaluation data to determine if each task of the number of tasks has been completed and controlling one or more of the task tools to switch to another task of the number of tasks after completion of the task.

14. The non-transitory computer-readable storage medium of claim 13, wherein the one or more requesting devices is part of a predefined group of requesting devices operating within a region.

15. The non-transitory computer-readable storage medium of claim 14, further causing the processor to generate a task list based on the at least one service request from the predefined group of requesting devices, tasks associated with the at least one service request from the predefined group of requesting devices, and sub-task areas associated with the at least one service request to maximize performance of the tasks associated with the at least one service request by the one or more autonomous machines.

16. The non-transitory computer-readable storage medium of claim 15, further causing the processor to transmit commands to the one or more autonomous machines to cause the one or more autonomous machines to drive to the sub-task areas and execute the tasks according to the task list.

17. The non-transitory computer-readable storage medium of claim 13, further causing the processor to, for at least one of the plurality of task areas, select one or more autonomous machines and one or more task tools from more than one of the base station pods to perform the number of tasks based on at least the number of tasks to be performed and the task area location of relative to a location of the base station pods.

* * * * *